United States Patent [19]

Dolin, Jr. et al.

[11] Patent Number: 5,737,529

[45] Date of Patent: Apr. 7, 1998

[54] NETWORKED VARIABLES

[75] Inventors: Robert A. Dolin, Jr., Menlo Park; Robert L. Einkauf, Fremont, both of Calif.; Richard S. Kagan, London, England; Glen M. Riley, Los Gatos; James M. Von De Bur, San Jose, both of Calif.

[73] Assignee: Echelon Corporation, Palo Alto, Calif.

[21] Appl. No.: 631,534

[22] Filed: Apr. 12, 1996

Related U.S. Application Data

[63] Continuation of Ser. No. 207,229, Mar. 7, 1994, Pat. No. 5,513,324, which is a continuation of Ser. No. 671,036, Mar. 18, 1991, abandoned.

[51] Int. Cl.$^6$ .................................................. G06F 13/00
[52] U.S. Cl. ........................................................ 395/200.18
[58] Field of Search ........................ 364/DIG. 1, DIG. 2; 395/200.01, 200.05, 200.08, 200.09, 200.15, 200.18, 280, 800

[56] References Cited

U.S. PATENT DOCUMENTS

| | | | |
|---|---|---|---|
| 3,582,901 | 6/1971 | Cochrane | 340/172.5 |
| 3,648,244 | 3/1972 | McGee | 364/172.5 |
| 4,001,785 | 1/1977 | Miyazaki et al. | 340/172.5 |
| 4,007,450 | 2/1977 | Haibt et al. | 340/172.5 |
| 4,216,528 | 8/1980 | Robertson | 364/468 |
| 4,319,338 | 3/1982 | Grudowski | 364/900 |

(List continued on next page.)

FOREIGN PATENT DOCUMENTS

| | | | |
|---|---|---|---|
| 0412232 | 2/1991 | European Pat. Off. | G06F 9/46 |
| 9015394 | 12/1990 | WIPO | G06F 15/46 |
| 9103017 | 3/1991 | WIPO | G06K 13/00 |

OTHER PUBLICATIONS

"Programming Languages for Distributed Computing Systems," ACM Computing Surveys, vol. 21, No. 3, pp. 260–322 (Sep. 1989).

Jerrold M. Ginsparg & Ronald D. Gordon, Automatic Programming of Communications Software Via Nonprocedural Descriptions, 1982 IEEE, pp. 1343–1347.

Primary Examiner—Robert B. Harrell
Attorney, Agent, or Firm—Blakely, Sokoloff, Taylor & Zafman

[57] ABSTRACT

An improved apparatus and method for communicating information in a networked system wherein network variables are employed to accomplish such communication. Network variables allow for standardized communication of data between nodes in a network. A first node may be programmed, for example, to sense certain information and to report the information as a network variable X. A second node may be programmed to receive the variable X and to control devices based on the current value of the variable. The present invention provides for defining connections between the first and second node to facilitate such communication and for determining addressing information to allow for addressing of messages, including updates to the value of the variable X, between the nodes.

10 Claims; 14 Drawing Sheets

U.S. PATENT DOCUMENTS

| Patent No. | Date | Inventor | Class |
|---|---|---|---|
| 4,373,193 | 2/1983 | Haag et al. | 364/900 |
| 4,386,416 | 5/1983 | Giltner et al. | 364/900 |
| 4,404,651 | 9/1983 | Grudowski | 364/900 |
| 4,432,057 | 2/1984 | Daniell et al. | 364/300 |
| 4,507,735 | 3/1985 | Moorehead et al. | 364/427 |
| 4,539,637 | 9/1985 | DeBruler | 395/650 |
| 4,545,013 | 10/1985 | Lyon et al. | 364/200 |
| 4,554,418 | 11/1985 | Toy | 179/2 DP |
| 4,568,930 | 2/1986 | Livingston et al. | 340/825.5 |
| 4,589,063 | 5/1986 | Shah et al. | 364/200 |
| 4,635,189 | 1/1987 | Kendall | 364/200 |
| 4,654,654 | 3/1987 | Butler et al. | 340/829.5 |
| 4,663,704 | 5/1987 | Jones et al. | 364/188 |
| 4,714,995 | 12/1987 | Materna | 395/800 |
| 4,720,782 | 1/1988 | Kovalcin | 364/200 |
| 4,727,575 | 2/1988 | Hansen et al. | 379/94 |
| 4,730,348 | 3/1988 | MacCrisken | 375/122 |
| 4,827,423 | 5/1989 | Beasley et al. | 364/468 |
| 4,831,582 | 5/1989 | Miller et al. | 364/900 |
| 4,843,545 | 6/1989 | Kikuchi | 364/300 |
| 4,855,906 | 8/1989 | Burke | 395/800 |
| 4,868,570 | 9/1989 | Davis | 341/106 |
| 4,885,684 | 12/1989 | Austin et al. | 364/300 |
| 4,918,690 | 4/1990 | Markkula Jr. et al. | 370/94 |
| 4,926,375 | 5/1990 | Mercer et al. | 395/325 |
| 4,937,760 | 6/1990 | Beitel et al. | 364/513 |
| 4,972,367 | 11/1990 | Burke | 364/900 |
| 4,974,151 | 11/1990 | Advani et al. | 364/200 |
| 4,980,822 | 12/1990 | Brantley, Jr. et al. | 395/400 |
| 5,093,916 | 3/1992 | Karp et al. | 395/700 |
| 5,101,348 | 3/1992 | Arrowood et al. | 395/200 |
| 5,109,486 | 4/1992 | Seymour | 395/200 |
| 5,146,607 | 9/1992 | Sood et al. | 395/800 |
| 5,148,533 | 9/1992 | Joyce et al. | 395/600 |
| 5,175,691 | 12/1992 | Baker et al. | 364/478 |

NETWORKED VARIABLES

This is a continuation of application Ser. No. 08/207,299, filed Mar. 7, 1994, now U.S. Pat. No. 5,513,324, which is a continuation of application Ser. No. 07/671,036 filed Mar. 18, 199, which is now abandoned.

BACKGROUND OF THE INVENTION

1. Field of the Invention

The present invention relates to the field of systems for distributed computing, communication and control and, more specifically, communication of information between devices in a distributed computing environment.

2. Description of the Related Art

In distributed computer systems it is necessary to provide for communication of information between nodes in the system. A number of methods for providing such communication are known in the art.

These methods include message passing techniques in which messages are passed, over a medium, from one node to another in a network. In message passing techniques, messages are built by a sender node and sent to one or more receiver nodes. The message is then parsed by the receiver node in order to correctly interpret the data. Message passing allows the advantage of passing large amounts of data in an expected format. Of course, over time the format of the message may be required to change to support new applications or features. This typically leads to compatibility issues between nodes on the network.

A second technique involves remote procedure calls in which a first node, requiring data which exists on a second node, calls a procedure executing on the second node where the data exists and requests the procedure to manipulate the data and provide a result to the first node. Remote procedure calls are typically suited to passing small amounts of data; however, a separate procedure call is typically required for each interchange. Therefore, it is likely in any networking system that over time additional procedure calls will be required in the network as new functions are carried out by the network. The addition of new procedure calls to certain nodes of the network leads to incompatibility between nodes, because the existing nodes do not know of and cannot execute the new remote procedure calls.

A third technique for communication of data in a network involves data sharing. Bal, Henri E., Steiner, Jennifer G., and Tanenbaum, Andrew S., *Programming Languages for Distributed Computing Systems*, ACM Computing Surveys, Vol. 21, No. 3, September, 1989, pp. 261-322 (hereinafter Bal et al.) describes certain data sharing techniques. A discussion of data sharing may be found in the Bal et al. article at pages 280, et seq. (It should also be noted that a discussion of messaging may be found in the Bal et; al. article at pages 276, et seq. along with a general overview of interprocess communication and synchronization.)

Bal et al. describes how parts of a distributed program can communicate and synchronize through use of shared data. Bal et al. states that, if two processes have access to the same variable, communication can take place by one processor setting the variable and the other processor reading the variable. This communication is described as being allowed to take place whether the two processors are both running on a host where the shared data is stored and thus can manipulate the shared data directly, or if the processes are running on different hosts and access to the shared data is accomplished by sending a message to the host on which the shared data resides.

Two types of shared data are described: (1) shared logical variables; and (2) distributed data structures. Briefly, shared logical variables are described as facilitating a communication channel between processes through a "single-assignment" property. Initially, a shared logical variable is unbound, but once a value is assigned to the variable the variable is considered to be bound. An example is provided in which the three goals of conjunction:

goal_1(X, Y), goal_2(X, Y), and goal_3(X)

are assumed and solved in parallel by processes P1, P2 and P3. The variable X is initially unbound and represents a communication channel between the three processes. If any of the processes binds X to a value, the other processes can use this value. Likewise, Y is a channel between P1 and P2. Processes synchronize by suspending on unbound variables. For example, if Y is to be used to communicate information from P1 to P2, then P2 may suspend until Y is bound by P1.

It should be emphasized that in the described concept of shared logical variables, the term binding is used to describe a process of assigning a value to a variable. As will be seen below, the term binding is also used to describe the present invention, however, the meaning of the term is significantly different and the reader is cautioned to avoid confusion between the concepts represented by these two uses of this term. Generally, in the present invention, the term binding is used to indicate a process of associating a variable of one node with a variable of at least one other node. It is not necessary that the variable of either node has yet been assigned a data value.

Distributed data structures are data structures which may be manipulated simultaneously by several processes. In concept, all processes share one global memory termed "tuple space" or TS. The elements of TS are ordered sequences of values, similar to records in a language such as Pascal. Three operations may take place on TS: (1) "OUT" adds a tuple to TS; (2) "READ" reads a tuple from TS; and (3) "N" reads a tuple from TS and deletes it from TS. Thus, in order to change the value of a tuple in TS it is necessary to first perform an IN operation, then to manipulate the data, and then perform an OUT operation. The requirement that a tuple must first be removed by the IN operation makes it possible to build distributed systems without conflict between accesses by the various processes.

Bal et al. contrasts distributed data structures with inter-process communication techniques noting that communication accomplished by distributed data structures is anonymous. A process reading a tuple from TS does not know or care which other process inserted the tuple. Further, a process executing an OUT does not specify which process the tuple is intended to be read by.

Bal et al. states that in concept distributed data structures utilizing the tuple space implement conceptually a shared memory, although in implementation a physical shared memory is not required. However, as can be seen, in a system utilizing such distributed data structures a single copy of the data is stored in tuple space whether or not such tuple space is implemented as a single physical shared memory. Separate copies of the data are not maintained for the various processes or on the various hosts. In fact, maintaining separate copies would lead to data conflict possibilities as the various nodes attempted to coordinate updates of the variable between the various process and hosts. Thus, the reason for requiring use of the IN command to delete a tuple before allowing manipulation of the data represented by the tuple.

The present invention discloses a networked communication system which is perhaps closest in certain concepts to the described distributed data structures. However, it can, of course, be appreciated that certain advantages may be gained from development of a system which utilizes certain features of distributed data structures while retaining flexibility in allowing multiple copies of a data value to be stored on the various nodes.

The present invention discloses certain improved programming language and daa structure support for communication, sensing and control as may be used by nodes of the present invention. It is known in the art to allow for scheduling of tasks through use of a programming statement such as a "when" clause or the like. However, in known systems such tasks may only be scheduled to be executed on the occurrence of a predefined event such as may be defined by the compiler writer. Examples of such events typically include expiration of a timer or input pin state changes. Such known systems do not allow for definitions of events, other than such predefined events. It has been discovered that it is useful to provide for definition of events as any valid programming language statement which may be evaluated to a true or false condition.

Of course, any number of known systems allow for declaration of variables and when declaring such variables certain parameters may be specified which may be set to a state indicative of a desired characteristic of the variable. For example, a variable may be declared as input or output, as a given variable type (e.g., boolean, numeric, etc.). However, once declared such characteristics are static and may only be changed by changing the source program which declares the variables. It has been discovered that it would be useful to provide for a system in which the state of at least certain parameters may be changed during system configuration allowing for greater flexibility in optimizing the system of the preferred embodiment.

Finally, in known systems it is necessary to call certain I/O library procedures to declare and use I/O devices. Such calls to I/O procedures may be quite complex and require significant skill on the pan of the programmer to properly code and utilize the routines. The present invention discloses a system having improved methods for declaration and use of I/O devices.

OBJECTS OF THE PRESENT INVENTION

It is a primary object of the present invention to provide for improved communication of information between nodes of a distributed network.

It is more specifically an object of the present invention to provide for improved communication of information in a highly distributed computer system in which a problem may be broken down into small units in which each node accomplishes a small pan of the entire application. In such a system, data communication may be typically accomplished in relatively small units of data—however, significant communication of data between nodes of the network is required.

It is further an object of the present invention to provide for improved communication of information in a distributed computing system by allowing for standard communication techniques between nodes.

It is still further an object of the present invention to provide for improved communication of information by providing certain facilities, structures and tools for such communication.

It is also an object of the present invention to provide improved data structures and programming language support for communication and other aspects of the present invention.

As one aspect of providing such improved data structures and programming language support, it is one aspect of the present invention to provide for declaration of variables having configurable parameters leading to improved ability to maintain and optimize networks of the present invention.

As another aspect of providing such improved data structures and programming language support, it is desired to provide for increased ease in declaring and communicating with I/O devices of the present invention.

As still another aspect of providing such improved data structures and programming language support, it is desired to provide for improved scheduling functions allowing for use of programmer-defined or predefined events in scheduling of tasks to be executed.

It is also an object of the present invention to provide simplified installation and network maintenance. Such an objective may be accomplished by storing in each node the node's application interface such that nodes may identify themselves and their application requirements to a network management node at installation time and when it is necessary to recover the complete network database.

To accomplish such a simplified installation and maintenance objective, it is a further objective of the present invention to define an interface file format which may efficiently store and allow retrieval of such identification and application requirement information.

These and other objects of the present invention will be better understood with reference to the Detailed Description of the Preferred Embodiment, the accompanying drawings, and the claims.

SUMMARY OF THE INVENTION

A network for communicating information having at least a first and second node is described in which each node includes data storage for storing data representing a variable V and further includes a processor coupled with the data storage. In the case of the first node, the processor may manipulate and write to new values to the variable V. After having updated the variable V with a new value, the processor then assembles and communicates a packet for transmission on the network. The packet includes the new data value for the variable V. The second node then receives the packet and stores the new value for the variable V in its data storage.

In particular, during programming of the first node, it is declared as a writer of the variable V and likewise during programming of the second node, it is declared as a reader of the variable V. During configuration of the network, a communication connection between the first node and the second node is defined and during later communication of message packets, addressing of message packets between the various nodes is accomplished through use of address tables based on the definition of such connections.

Further, it is disclosed to utilize a standardized set of variable types in accomplishing such communication. Use of a standardized set of variable types leads to increased compatibility between nodes of different manufacture as well as increased ease in configuring networks.

Finally, certain extensions are provided to standard programming languages to provide for increased ease of use of the data communication features of the present invention.

These and other aspects of the present invention will be apparent to one of ordinary skill in the art with further reference to the below Detailed Description of the Preferred Embodiment and the accompanying drawings.

Figure 1:
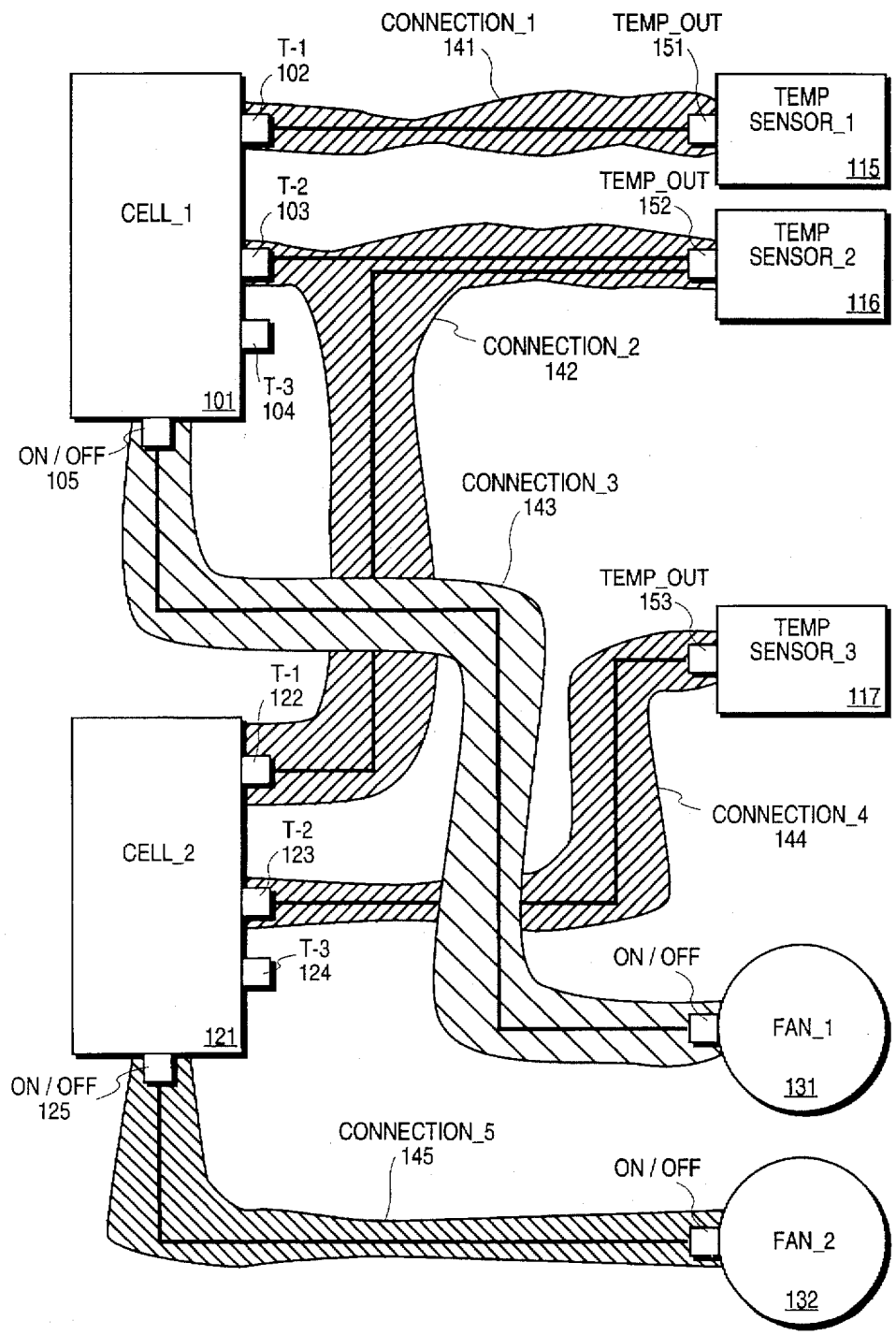
FIG. 1 is a logical view of a configuration of devices as may be networked using methods and apparatus of the present invention.
Figure 9:
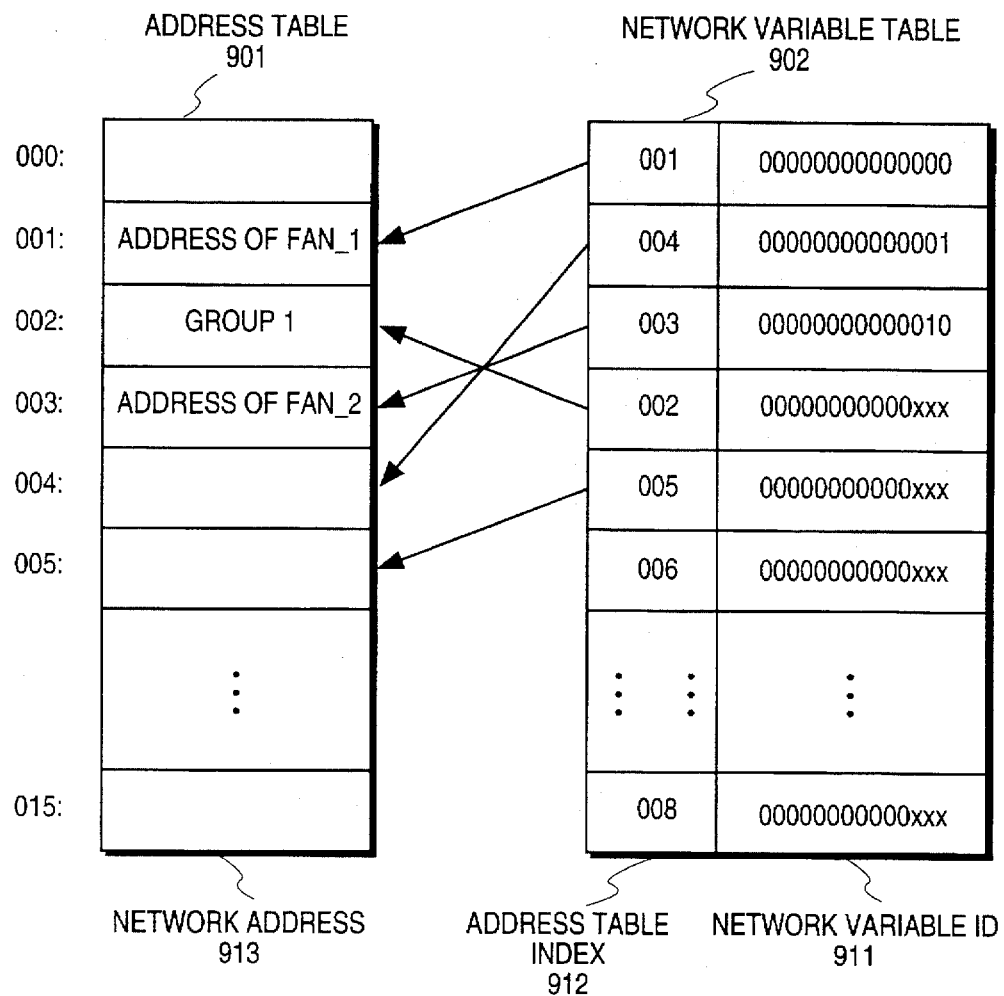
FIG. 9 is an illustration of certain data structures which may be utilized by the present invention.

For ease of reference, it might be pointed out that reference numerals in all of the accompanying drawings typically are in the form "drawing number" followed by two digits, xx; for example, reference numerals on FIG. 1 may be numbered 1xx; on FIG. 9, reference numerals may be numbered 9xx. In certain cases, a reference numeral may be introduced on one drawing, e.g., reference numeral 201 illustrating a communication medium, and the same reference numeral may be utilized on other drawings to refer to the same item.

DETAILED DESCRIPTION OF THE PREFERRED EMBODIMENT

An improved computer network including facility for communication of information between nodes in the network is described. In the following description, numerous specific details are set forth in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

OVER VIEW OF THE NETWORK OF THE PRESENT INVENTION

The network of the preferred embodiment is of the type which provides for sensing, control and communication. The network of the present invention and nodes utilized within the network of the present invention are described in greater detail with reference to U.S. Pat. No. 4,918,690 Markkula et al. titled "Network and intelligent cell for providing sensing, bi-directional communications and control", which patent is assigned to the assignee of the present invention (referred to herein as the '690 patent).

In an exemplary network, the network of the present invention may provide for sensing of current environmental factors and control of apparatus affecting the environmental factors. Further, the network may allow for communication of information packets providing information on the environmental factors between nodes in the network. The present application will utilize, as an example, a network for control of fans based on sensing and communicating information regarding temperature in different zones in a controlled environment.

It might be worthwhile noting that in an expected scenario, various manufacturers will include a node of the type defined by the present invention in their products. For example, a thermostat manufacturer may include such a node in its thermostats. A fan manufacturer may include such a node in its fans. The various nodes may be programmed for specific applications by their respective manufacturers and, when configured in an environmental control system, are useful for communication, sensing and control between various components of the system. A node of the preferred embodiment is illustrated in block diagram form with reference to FIG. 4. Such nodes may be programmed, for example, using the "C" computer programming language. As one aspect of the present invention, certain extensions have been provided to the "C" language to facilitate network communications.

As a further and important aspect of the present invention, network variables are described which provide for communication of information between nodes of the network. A network variable may be thought of as a data object shared by multiple nodes where some nodes are "readers" and some nodes are "writers" of the object. This will be discussed in greater detail below.

A network as may be implemented utilizing the present invention

Referring now to FIG. 1, a logical view of a network as may utilize the present invention is shown. The network may, for example, include three separate temperature sensors 115–117 located in three separate zones of a building for sensing and communicating temperature information. The network may further include two control cells 101 and 121 coupled to receive temperature information from the sensors 115–117 and to control two fans 131–132 (by turning the fans 131–132 on and off). In the exemplary network, network variable temp_out 151 is coupled to a first network variable temperature input 102 of control cell 101. Network variable temp_out 152 is coupled with a second network variable temperature input 104 of control cell 101. In the illustrated embodiment, a third network variable temperature input 103 is not utilized. On/Off control network variable 105 of control cell 101 is coupled to control an input network variable, On/Off, of a fan 131. Thus, in this embodiment, sensing a temperature above a given level in the zone of the building sensed by temperature sensor 115 or by temperature sensor 116 will cause fan 131 to be turned on. Likewise, when the temperature in these zones is again lowered below a given level, the fan 131 may be turned off.

Network variable temp_out 152 is also coupled to a first temperature input network variable 122 of control cell 121. In addition, network variable temp_out 153 is coupled to a second temperature input network variable 123 of control cell 121. A third temperature input 124 of control cell 121 is not utilized in this embodiment. Control cell 121 is coupled through an On/Off control output network variable 125 to control fan 132. Thus, sensing a temperature above a given level in the zone of the building sensed by temperature sensor 116 or by temperature sensor 117 will cause fan 132 to be turned on. Likewise, when the temperature in these zones is again lowered below a given level, the fan 132 may be turned off. As is appreciated, in the described configuration, when temperature sensor 116 detects a high temperature, both fan 131 and fan 132 are turned on.

FIG. 1 has been labeled to illustrate logical connections between the various components. Connection 141 is illustrated as the connection between temperature sensor 115 and control cell 101. Connection 142 is illustrated as the connection including temperature sensor 116, control cell 101 and control cell 121. Connection 143 is illustrated as the connection between control cell 101 and fan 131. Connection 144 is illustrated as the connection between sensor 117 and control cell 121. Connection 145 is illustrated as the connection between control cell 121 and fan 132. The connection of network variables will be discussed in greater detail below. However, it may now be useful to introduce three new terms: network variables, readers, and writers. In addition, general definitions for certain other terms used in this specification may be found with reference to Table XV.

As one important aspect of the present invention, the present invention provides for allocation and use of network variables by processes running on nodes in a network. As stated above, network variables may be thought of as a data object shared by multiple nodes where some nodes are "readers" of the object and other nodes are "writers" of the object. Additionally, a node may be both a reader and a writer with "turnaround". Writing with turnaround is discussed in greater detail below. Although the data object may be thought of as being shared by multiple nodes, as will be understood from the discussion below, the network variable of the preferred embodiment is not stored in shared memory but rather separate memory is provided in each of the multiple nodes to store a copy of the data object. A writer node may modify the value of the data object and all reader nodes of that network variable have their memories updated to reflect the change. Thus, for example, each of the temperature sensors 115–117 may run a process which declares a data object as follows:

network output boolean temp_high.

Each of the controller cells 101 and 121 may declare data objects as follows:

network input boolean temp_high network output boolean fan_on.

Each of the fans 131–132 may declare a data object as follows:

network input boolean fan_on.

The complete syntax for declaration of network variables in the system of the preferred embodiment is given in Table VIII. The keyword "network" indicates the data object is a network variable. A network variable declared as output will result in transmission of the new value of the network variable on the network when the program stores the variable—thus, nodes having declared an output network variable are considered writer nodes for that variable. For example, each time a process running on temperature sensor 115 stores the variable temp_high, a network message is generated communicating the new value of temp_high. The message is communicated to all reader nodes connected in connection_1 141, i.e., to control cell 101. In the case of temperature sensor 116 changing the value of its temp_high variable, a message is generated and transmitted to all nodes connected in connection_2 142, i.e., to both control cell 101 and to control cell 121. The process for configuring connections as disclosed by the present invention will be discussed in greater detail below.

Although the preferred embodiment declares nodes as either writers or readers of network variables, it should be noted that in an alternative embodiment a node may be declared as a both a reader and writer of a particular variable. Such an embodiment may be envisioned without departure from the spirit and scope of the present invention.

It might be that the present invention in its preferred embodiment allows an output network variable to be initialized using an initialization command without causing a message to be transmitted on the network. Using this command, a node may be initially configured or reset without affecting other nodes on the network.

Network variables declared as input may change values asynchronously with program execution—this declaration is used for "reader" nodes. In the preferred embodiment, input network variables may also change values at program initialization or at other points under program control; however, the changed value will not be transmitted on the network.

At anytime, a reader node may force an update of its input network variables utilizing a polling function of the present invention. When this function is called, the specified network variables are updated by requesting over the network the current value from the writer node or nodes. This facility may be useful, for example, after a node reset to allow the node to determine the current value of network variables without need to wait until the next time the writer nodes update the value of those variables.

Thus, temperature sensors 115–117 are writer nodes of the variable temp_high. Control cells 101 and 121 are reader nodes of the variable temp_high and also are writer nodes of the variable fan_on. Fans 131–132 are reader nodes of the variable fan_fan.

Of course, many other applications and configurations are within the scope of the teachings of the present invention and the network described with reference to FIG. 1 is merely exemplary.

It should be noted that multiple readers and multiple writers may be provided within a single connection without departure from the spirit and scope of the present invention. Multiple readers are illustrated with reference to connection_2 142. Multiple writers have not been illustrated by FIG. 1. However, variation in which multiple writers are employed will be readily apparent to one of ordinary skill in the art.

Figure 2:
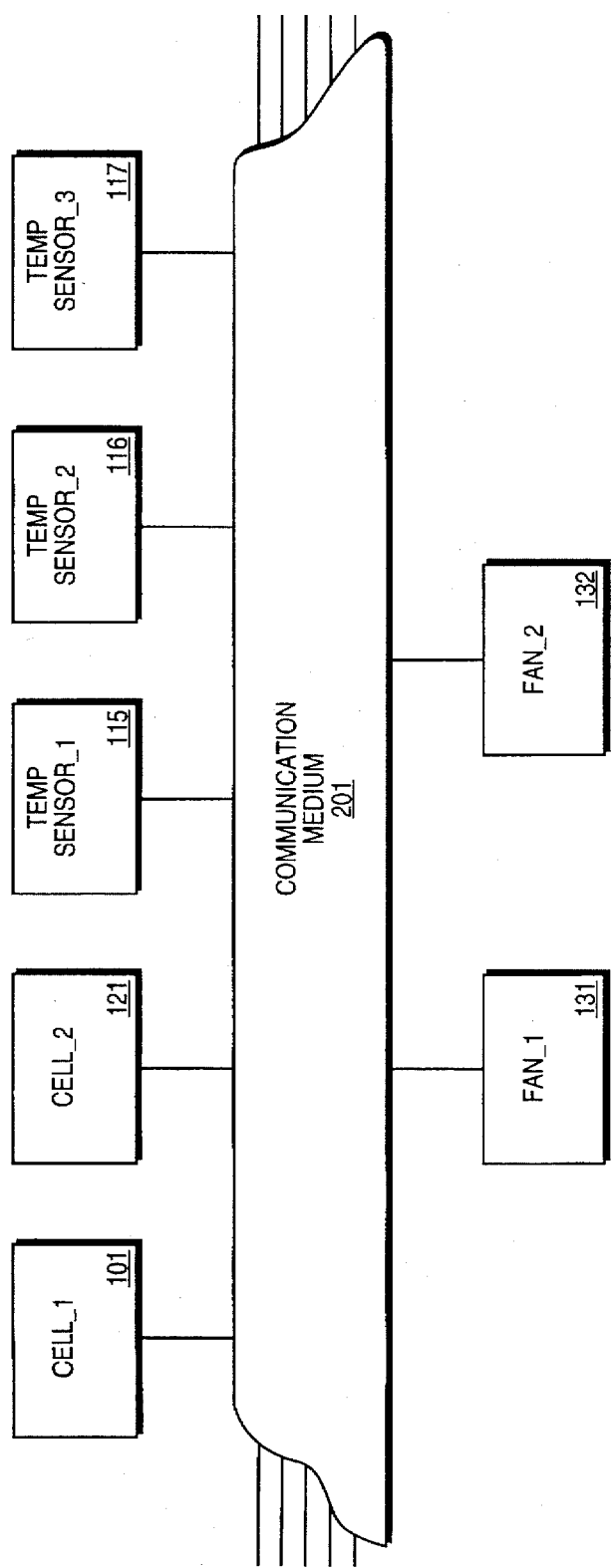
FIG. 2 is a diagram illustrating an embodiment of the network of FIG. 1 as may be accomplished by the present invention.

Turning to FIG. 2, an embodiment of the network of FIG. 1 is illustrated in which each of cell 101, cell 121, temperature sensor 115, temperature sensor 116, temperature sensor 117, fan 131 and fan 132 are each coupled to communicate over common communication medium 201. The communication medium 201 may be, for example, twisted pair wiring, radio frequency, power lines, or other communication channels or multiple physical channels connected together with bridges and/or routers. In this embodiment, and in order to accomplish the connections illustrated by FIG. 1, temperature sensor 115 must be configured to address and communicate with cell 101; temperature sensor 116 must be configured to address and communicate with cell 101 and cell 121; temperature sensor 117 must be configured to address and communicate with cell 121; control cell 101 must be configured to address and communicate with fan 131; and control cell 121 must be configured to address and communicate with fan 132.

Of course, providing for such addressing may be and typically is a significant task. It is appreciated that each of control cells 101 and 121, temperature sensors 115-117 and fans 131-132 may be engineered, programmed and/or manufactured by different sources. Further, although the exemplary network is, in itself, complicated having 5 separate connections, 141-145, it can of course be imagined that other networks may be substantially more complicated having even hundreds or more connections. Therefore, the present invention implements methods and apparatus which allow for straightforward and efficient configuration of nodes in a network.

Figure 3A:
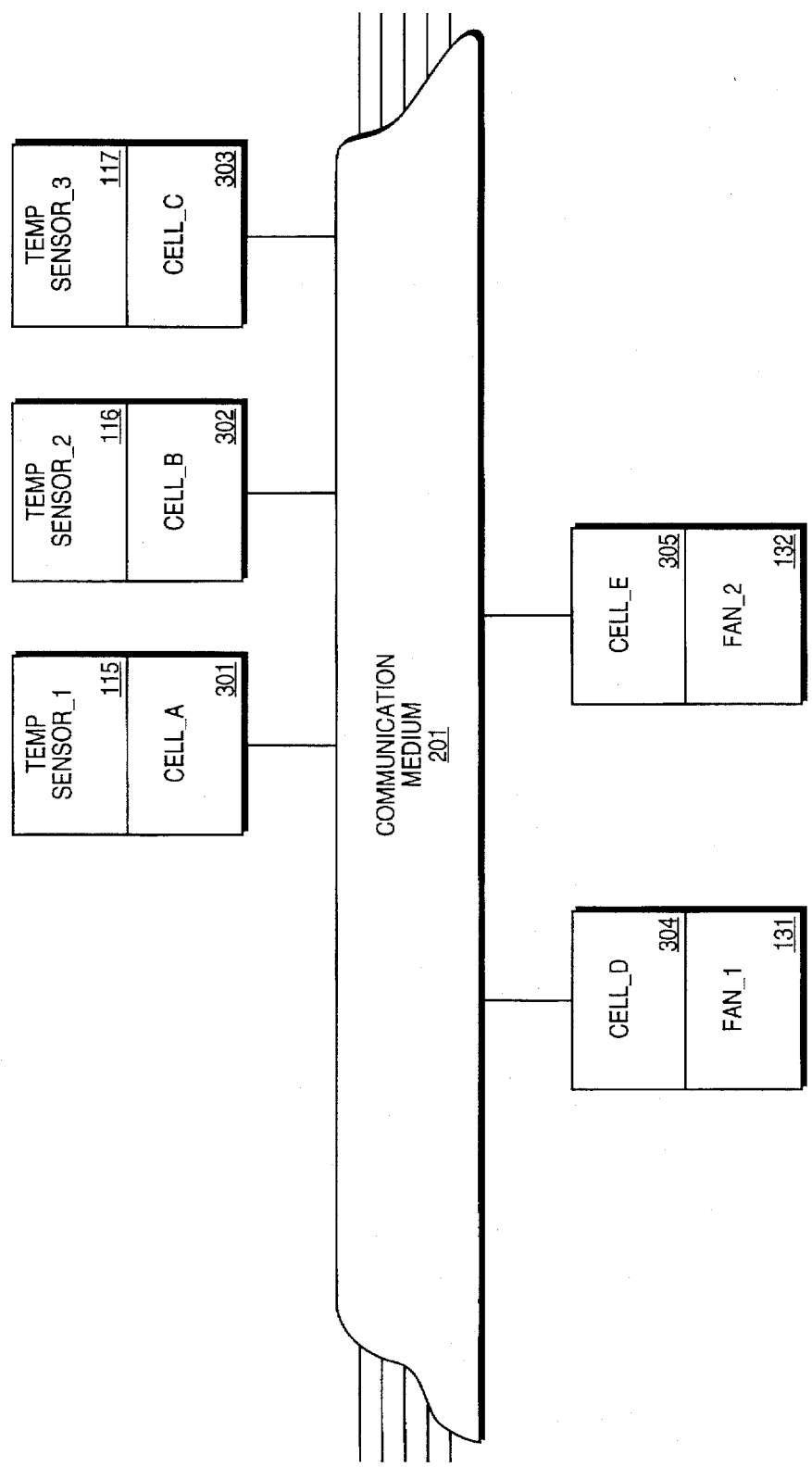
FIG. 3(a) is a diagram illustrating a second embodiment of the network of FIG. 1 as may be accomplished by the present invention.

Turning now to FIG. 3(a), a modified embodiment of the configuration of FIG. 2 is illustrated. In this embodiment, controller cells 101 and 121 have been removed from the configuration and each of temperature sensors 115-117 and fans 131-132 are illustrated as comprising nodes 301-305, respectively. These nodes are preferably of the type which are capable of sensing, communicating and controlling as have been described in the '690 patent and which are shown in greater detail with reference to FIG. 4. Thus, these nodes 301-305 are capable of replacing certain control functions of the control cells 101 and 121, eliminating the need for separate control cells in the described embodiment. In the embodiment of FIG. 3(a), and in order to accomplish the logical connections illustrated by FIG. 1, node 301 must be configured to communicate with node 304; node 302 must be configured to communicate with nodes 304 and 305; and node 303 must be configured to communicate with node 305. Again it is important to note that the temperature sensors 115-117 and fans 131-132 may be manufactured by different sources. It is preferable that the manufacturing sources are not required to have prior knowledge as to what devices their products will communicate with in a network. Thus, the manufacturer of temperature sensor 115 is preferably not required to be aware, during programming and manufacture of temperature sensor 115, whether temperature sensor 115 will be configured in a network to communicate with a controller cell, such as controller cell 101 (as shown in FIG. 2), or to communicate directly with a fan, such as fan 131 (as shown in FIG. 3(a)), or even with some other device (perhaps a heater, air conditioner, fire extinguishing equipment, etc.). Likewise, it is preferable that the manufacturer of fans 131-132 are similarly allowed to manufacture devices without requirement of prior knowledge as to the eventual uses of those devices in a network.

In order to allow for such flexibility in configuring networks and to allow for efficient communication between nodes in a network, the present invention provides network variables which may be used to facilitate standards of communication between nodes in the network.

Table I illustrates a temperature sensor control program as may be used to program nodes 301-303 coupled with temperature sensors 115-117. As can be seen, the program of Table I is written to communicate onto the medium 201 a network variable indicative of the state of temp_in. The value of this variable may be, for example, used by a control program running on a control cell, such as control cell 101 or 121, or used directly by a control program running on a fan, such as fans 131-132.

Table II illustrates a fan control program which may be used for controlling a fan such as fans 131-132 by turning the fan on and off responsive to receiving changes in state of a network variable on_off. As can be seen, the program of Table II is written to allow receiving from the medium 201 the network variable on_off as a binary network variable regardless of the source (e.g., whether from a control cell such as control cell 101 or 121, or directly from a temperature sensor, such as temperature sensor 115-117).

Figure 3B:
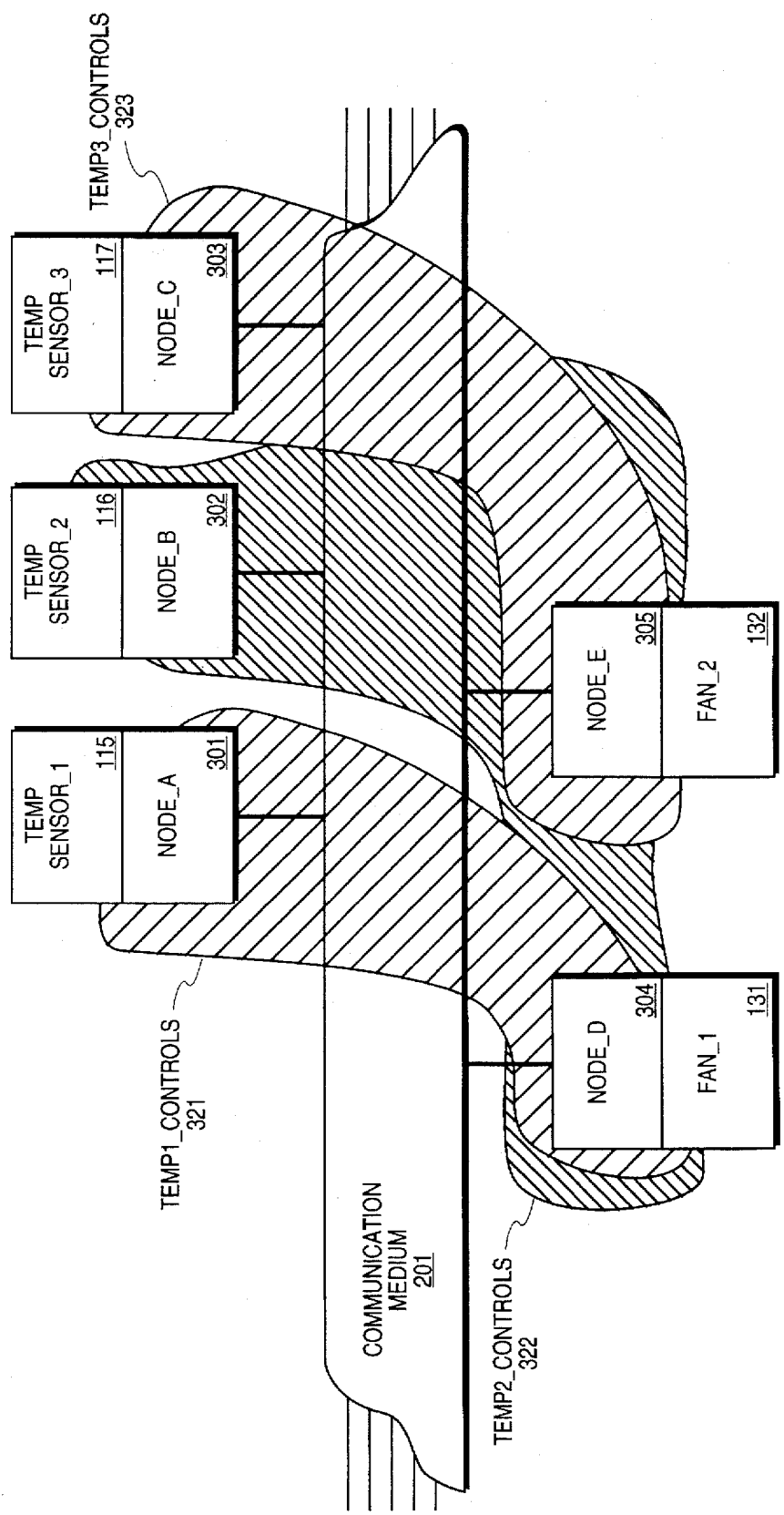
FIG. 3(b) is a second diagram illustrating the second embodiment of FIG. 3(a) and including a logical view of certain connections of nodes of the network.

Table III illustrates a binding set which connects temperature sensors 115-117 with fans 131-132 as illustrated by FIG. 3(a). FIG. 3(b) is provided to further an understanding of the binding set. As can be seen, the binding set provides for three connections illustrated as temp1_controls 321, temp_controls 322, and temp3_controls 323 of FIG. 3(b). The connection temp1_controls connects the output variable temp_high of temperature sensor 115 with the input variable fan_on of fan_1 131. The connection temp_controls connects the output variable temp_high of temperature sensor 116 with the input variable fan_on of both fan_1 131 and fan_2 132. Finally, the connection temp3_controls connects the output variable temp_high of temperature sensor 117 with the input variable fan_on of fan_2 132.

It should be noted that although tables I, II and III illustrate programs which are useful for illustrative concepts of the present invention, an attempt has not been made to ensure these programs are syntactically correct. Rather, these programs are provided for the exemplary teaching of concepts of the present invention. It is understood from an examination of the programs of tables I and II that the program of Table I may write the variable temp_high without regard to the eventual recipient of the variable and likewise the program of Table II may read the variable fan_on without regard to the writer node of the variable. Thus, these programs work equally well in a network such as illustrated by FIG. 2 including separate control cells 101 and 121 or in a network such as illustrated by FIG. 3(a) which does not include such control cells. The binding set illustrated by Table III determines the relationship between the various nodes of the network. Table IV illustrates a binding set which may be used to establish connections in a network such as illustrated by FIG. 2.

A node of the present invention

Figure 4:
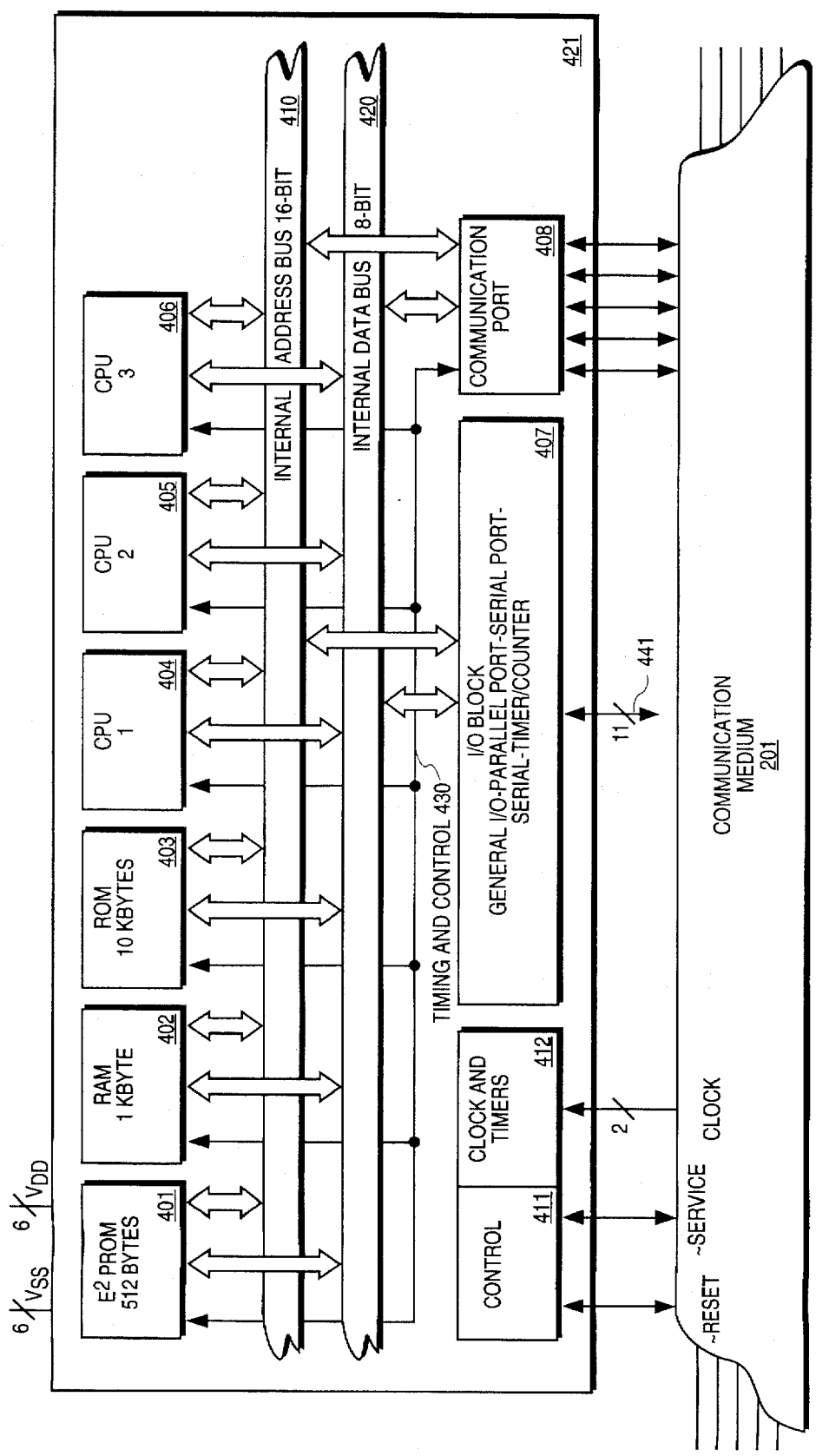
FIG. 4 is an overall block diagram of a single node of the present invention coupled with a communication medium.

FIG. 4 illustrates a block diagram of a node such as nodes 301-305 as may be utilized by the present invention. The node 421 is coupled in communication with medium 201 through control 411, clock and timer circuitry 412, and communication port 408. In addition, the node provides a general purpose I/O port 407 allowing for communication with various external devices. The node further comprises three separate processors 404-406, a read only memory (ROM) 403, a random access memory 402, and an EEPROM 401. The processors 404-406 are useful for executing programs such as the programs illustrated in Tables I and II, as well as other communication, control and operating programs. The ROM 403 may be useful for storing such programs. As will be seen, the EEPROM 401 may be useful for storing certain data values which, although configurable, are not subject to frequent changes in value. Each of the processors 404-406, ROM 403, RAM 402, EEPROM 401, control 411, clock 412, I/O port 407, and communication port 408 are coupled in communication through internal address bus 410, internal data bus 420 and timing and control lines 430.

PROGRAMMING AND CONFIGURING A NETWORK OF THE PRESENT INVENTION

Figure 5:
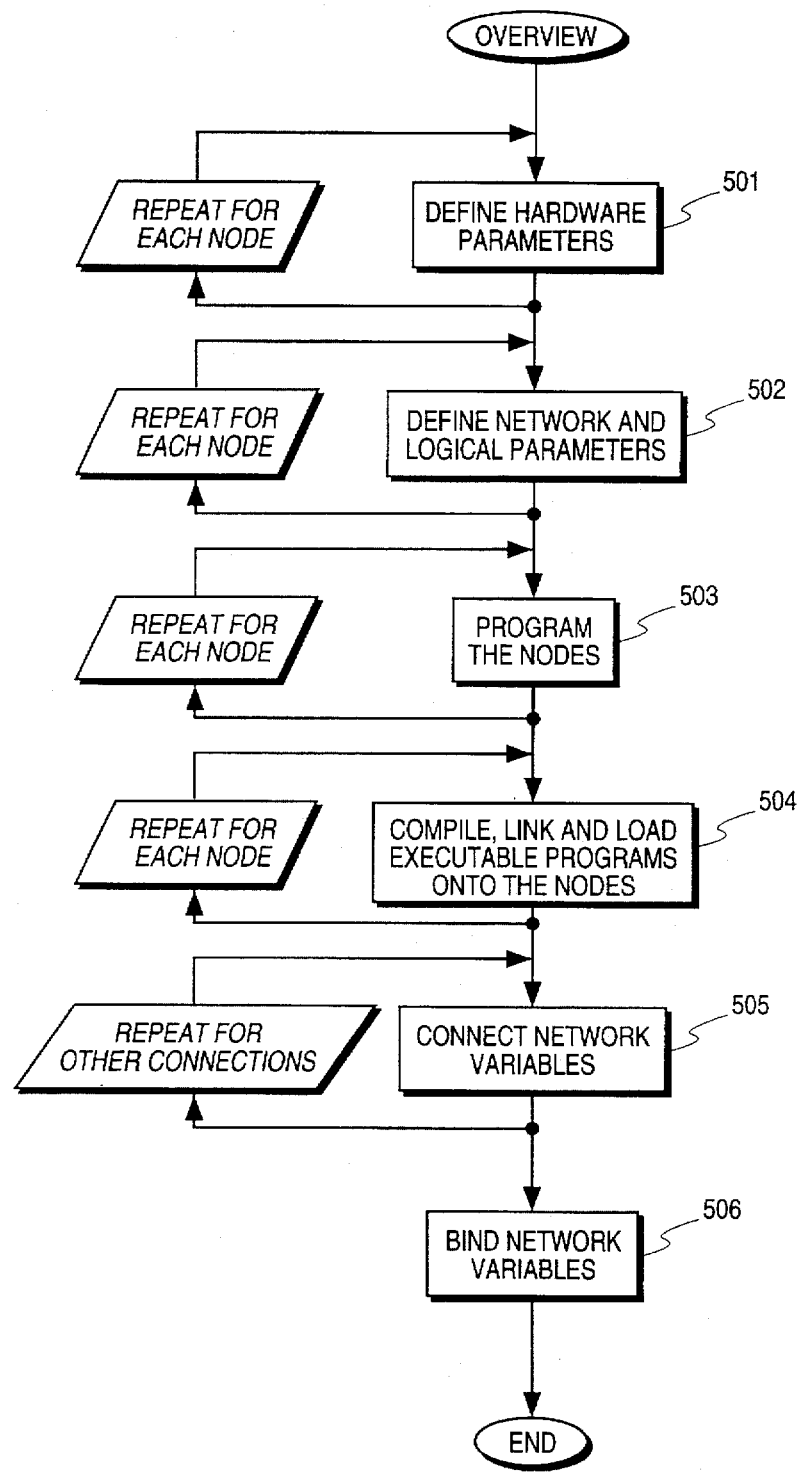
FIG. 5 is an overall flow diagram illustrating a method of programming and configuring a network as may be accomplished by the present invention.
Figure 6:
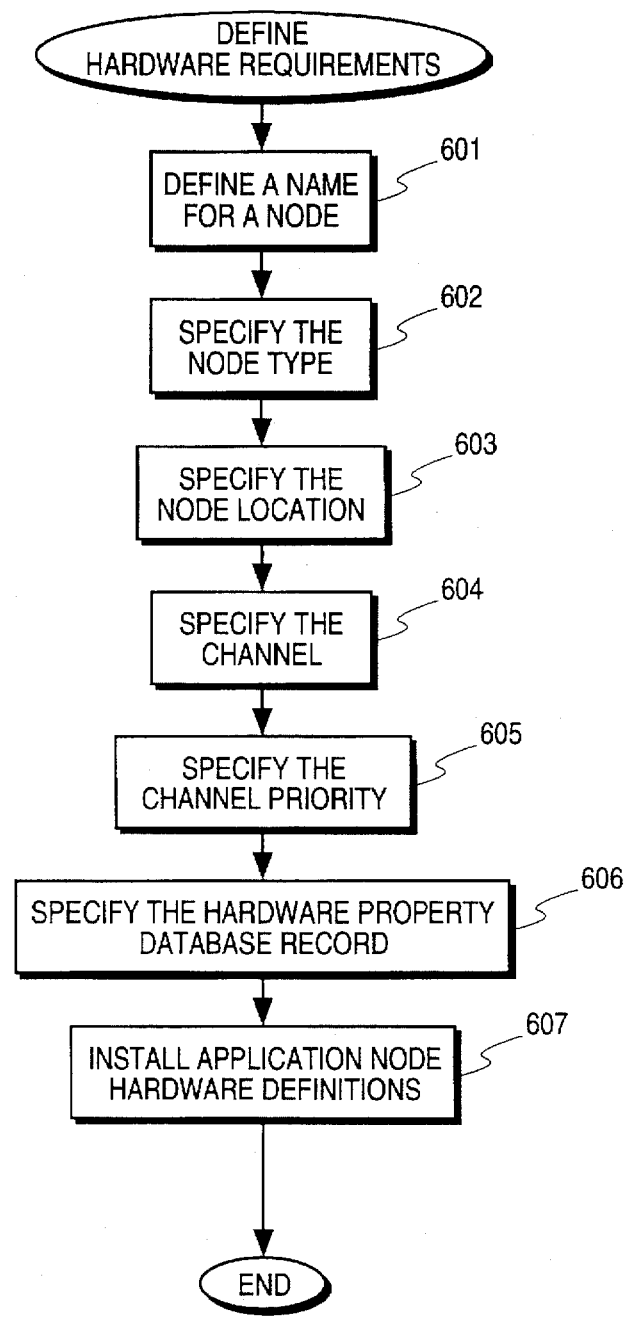
FIG. 6 is a flow diagram illustrating a method for defining hardware requirements of a node as may be utilized by the present invention.
Figure 7:
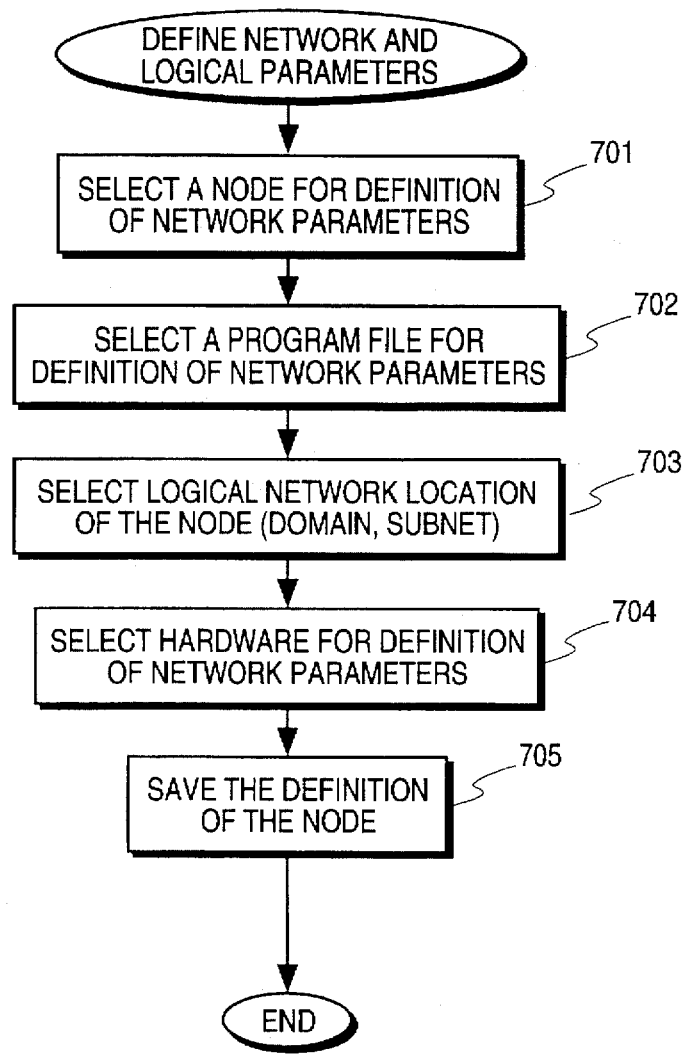
FIG. 7 is a flow diagram illustrating a method for defining network and logical parameters of a node as may be utilized by the present invention.

Turning now to FIG. 5, steps for programming and configuring a network of the present invention are illustrated. It should be noted that steps illustrated by FIG. 5 are implemented in a development system which allows for development and management of networks such as may be implemented by the present invention. However, certain of these steps may also take place outside of the development environment (e.g., connection of network variables and binding). The development system is an integrated hardware and software environment that operates in conjunction with a host computer, an IBM PC/AT compatible in the currently preferred embodiment, allowing a manufacturer or other party to design and build components compatible for communication with a network of the present invention.

The development system includes an IBM PC/AT-compatible computer having an interface adapter card for coupling with a control processor located in a separate card cage. In addition to the control processor, the card cage may hold other cards designed to emulate routing functions in a network and transceiver evaluation boards allowing evaluation of the physical interface with various media, e.g., twisted pair, power line, or radio frequency.

Initially certain hardware parameters are defined for each node in the network, block 501. This step includes naming or otherwise identifying the node, block 601. A node type is specified, block 602. In the development environment, the node type may be specified as the control processor, an emulator board, or a custom node type. The location of the node is then specified—the location specifies whether or not the node resides in a card cage and, if the node resides in a card cage, the card cage number and slot number, block 603. Next, the channel to which the node is connected is specified, block 604, and the channel's priority is specified, block 605. If the node has been assigned the priority privilege, then the node's priority is set at this time. Finally, certain hardware properties may be specified, block 66. Hardware properties may include model numbers for the node, clock rates, operating system revision levels, ROM size, RAM size, EEPROM size, RAM start address, and EEPROM start address. Finally, the hardware definitions are downloaded to the node, block 607.

Next, network and certain logical parameters are specified for each node, block 502. Currently, this step involves specifying a node name, block 701, and then specifying a program file, block 702, selecting a logical network location of the node, block 703, and hardware device name, block 703 associated with the node. Hardware names were specified above in step 601. Program files will be discussed in greater detail below in connection with block 503. The definition of the node is then saved, block 705.

The development environment provides an editor for developing and editing program code, block 503, such as the code illustrated in tables I and II. The preferred embodiment allows programming in the "C" language and, further, provides certain extensions to the "C" language which will be discussed in greater detail below. After developing program code, the programs are compiled, linked and loaded as executable programs, block 504, onto the nodes specified in definition of network and logical parameters, block 502.

Connections are then specified for the network, block 505. This step is better illustrated with reference to FIG. 8(a). Initially, a connection name is entered (for example, the connection names specified in the binder script of Table III are temp1_controls, temp_controls and temp3_controls), block 801. In the preferred embodiment, the connection name is entered as a unique name having from one to 16 characters consisting of letters, numbers and underscores; no spaces are allowed.

Next, a node name is selected, block 802. In the preferred embodiment, a list of defined nodes (i.e., nodes which have been previously defined as described in connection with block 502) is displayed and a valid node name may be selected from the displayed list. For example, the node temp_sensor_1 may be selected. After selecting a node name, block 802, a network variable name is selected, block 803. Again, a list of network variable names for the selected node are preferably displayed and a network variable name is selected from the displayed list. For example, the network variable temp_high may be selected.

After completing this process for a first node, a second node may be selected, block 804. Again, a node list is preferably displayed and the second node is selected from the displayed node list. For example, the node fan_1 may be selected. A network variable associated with the second node is then selected, block 805, again preferably from a displayed list. Continuing the example, the selected network variable may be fan_on.

Finally, certain parameters may be set, block 806. In the preferred embodiment, settable parameters include the retry count set to the maximum number of times the message will be sent, the retry timer for acknowledged services, and the repeat timer for unacknowledged/repeated messages. This aspect of the present invention will be discussed in greater detail below.

The connection is then added to a connection list using an add function, block 807. It is noted that if additional nodes are to be connected in the connection, they are specified in a similar manner to the fast and second nodes after having specified the fast and second nodes. An example of such a connection is illustrated in Table III as temp2_controls which includes three nodes: temp_sensor_2, fan_1 and fan_2.

Figure 8A:
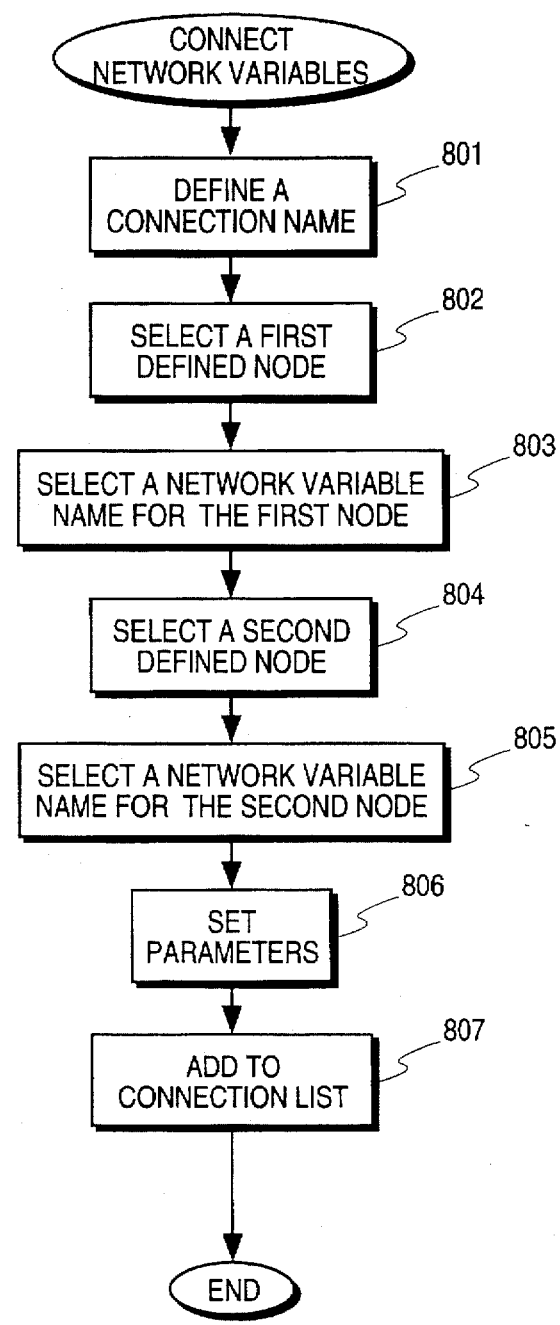
FIG. 8(a) is a flow diagram illustrating a method for defining connections among network variables as may be utilized by the present invention.

The process of FIG. 8(a) is repeated for each desired connection. In the case of the binding set of Table III, the process is repeated three times: (1) once for the connection named temp1_controls; (2) once for the connection named temp_controls; and (3) once for the connection named temp3_controls. In the case of the binding set of Table IV, the process is repeated five times, once for each of connection_1, connection_2, connection_3, connection_4, and connection_5.

In the preferred embodiment, the output of the connection process is a binary script file that provides commands to drive the subsequent binding process. In order to provide a textual version of what this binary file looks like, Table III and Table IV have been provided.

It is also within the power of one of ordinary skill in the an to develop a graphical user interface for drawing the connections between iconic representations of the nodes and creating a binder script based on such drawings.

Figure 8B:
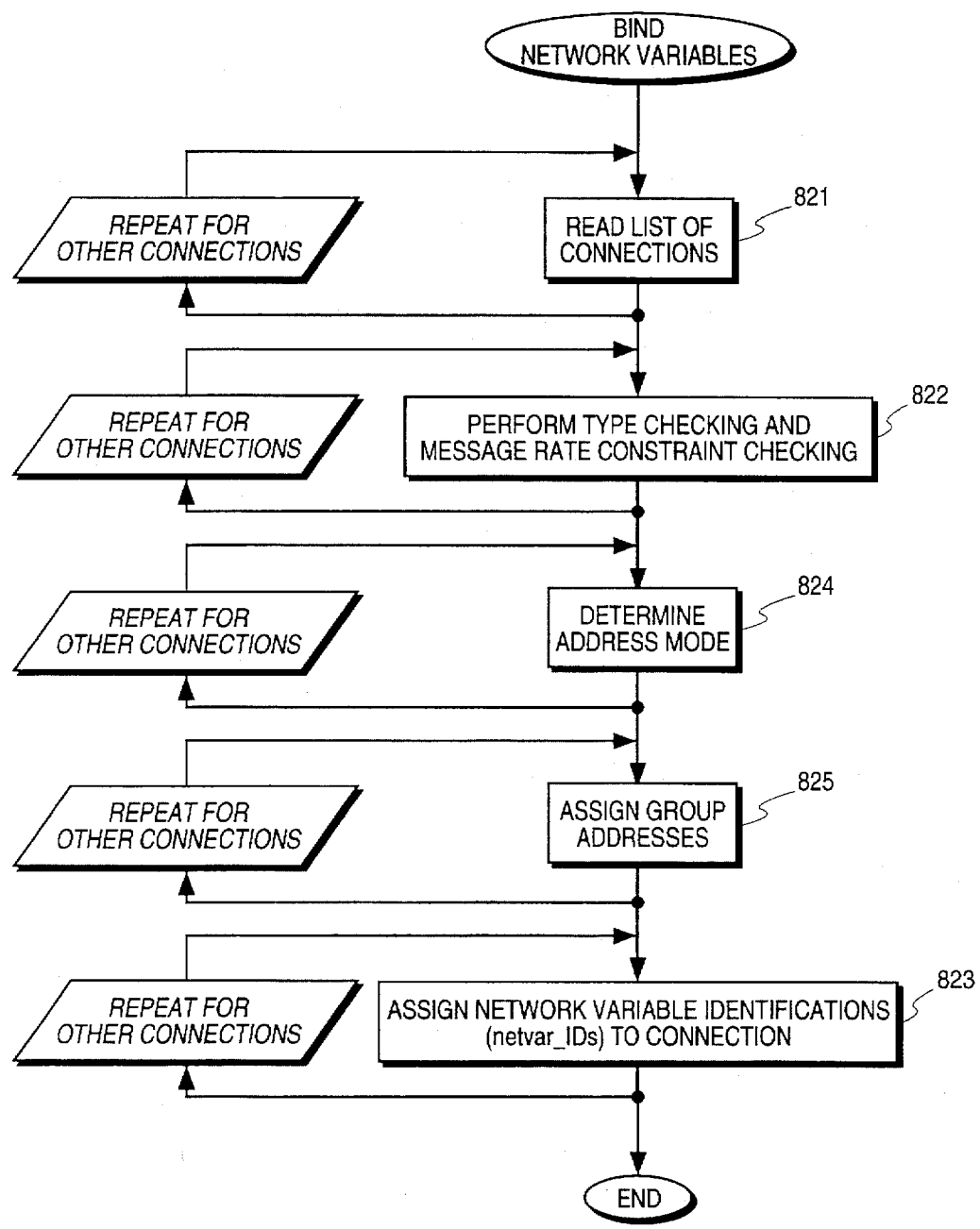
FIG. 8(b) is a flow diagram illustrating a method for binding network variables as may be utilized by the present invention.

Finally, the network variables are bound, block 506, to their respective nodes in order to allow communication within the connections defined during execution of the steps of FIG. 8(a). The preferred method of binding network variables is described in greater detail with reference to FIG. 8(b).

Initially, the list of connections developed during execution of the steps of FIG. 8(a) is read, block 821. Then, certain type checking and message constraint checking is performed for each connection, block 822. The type and message constraint checking includes the following checks:

(1) Ensure that there are at least two members in each connection;

(2) Ensure that there is at least one output member and one input member for each connection;

(3) In the preferred embodiment, no more than one input and one output network variable from the same node may appear in the same connection;

(4) A warning is given if polled output variables are not attached to at least one polled input;

(5) An estimate for message rates may be declared for network variables; a warning is given if the estimated message rates do not match for all members of a connection;

(6) Network variables may be synchronized or non-synchronized—a warning message is provided if synchronized variables are bound to non-synchronized variables;

(7) Network variables may be sent as authenticated—a warning is provided if some, but not all, members of a connection are declared as authenticated; and (8) Variable types are checked field-by-field for size and sign type matching and for type definition matching. The currently preferred list of type definitions are provided in Table V.

After completing type and message rate constraint checking, the addressing mode for the network variable is determined, block 824. If there is only one destination (e.g., temp1_controls), subnet-node addressing is used using the subnet-node structure given below to create an entry in address table 901. Address table 901 will be discussed in greater detail below. The address entered in the address table 901 is the address of the destination node (e.g., in the case of temp1_controls, the address of fan_1 is entered in the address table of temp_sensor_1; conversely, the address of temp_sensor_1 is entered in the address table of fan_1 to allow for such functions as polling of the current status of the network variable). The address table index entry 912 is set to correspond to the location in the address table 901 corresponding with the address entered in the address table 901. For example, in the case of the bind set of Table III, if the address of FAN_1 is entered as a network address 913 in the address table 901 at entry 001, the address table index entry 912 of the network variable table 903 corresponding to the network variable id assigned to the connection temp1_controls is written with the address 001. In this way, whenever messages are sent on the network by temp_sensor_1 indicating the value of temp_high has been updated, the address table index is used to lookup the address of the destination node of such a message. A message is then sent, addressed to the destination node, including the network variable id and the new value. The destination node then receives the message and is able to update the value of its corresponding network variable "fan_on".

If there is more than one destination node (e.g., temp2_controls), group addressing is used using the above group address structure to create an entry in the address table 901. In the case of group addressing, a set of sender and destinations for the network variable is constructed. For example, in the case of the connection temp_controls, the set of sender and destinations includes temp_sensor_2, fan_1 and fan_2.

Other optimization steps are also provided by the binder of the preferred embodiment and are described in further detail below.

After determining an addressing mode, for each unique set of sender and destinations (unique without respect to which nodes are senders and which nodes are receivers), a group address is assigned to the set, block 825. The group address is propagated to the address table of each of the nodes in the set and storm in their respective address tables 901. The address table index value 912 for the entry corresponding to the group address is updated to index the address table 901 at the new entry. For example, group1 is defined to include temp_sensor_2, fan_1 and fan_2 and the group address is stored at entry 002 of the address table 901. Then, the address table index 912 for each of the three nodes temp_sensor_2, fan_1 and fan_2 is updated to point to the new address table entry.

For group address table entries, as described above, only the output network variable nodes actually set their network variable table entries to index the address table. The nodes with input network variables will not index the address table. This allows the same network variable to reside in several network variable connections, and many network variable groups. When an incoming message arrives for one of these input network variables, the correct network variable table entry is found using the network variable ID (the software matches the network variable ID in the message to one in the table).

This "intersecting connection" ability makes the network variable concept more powerful by allowing the same variable to be updated by several groups, thus reducing both the overall network traffic and reducing network variable table space by sharing the same table entry among several connections.

Finally, a single network variable identification number (netvar_ID) is assigned to each network variable in the connection, block 823. This may be better understood with reference to FIG. 9 which illustrates a network variable table 902 having a network variable identification field 911 and an address table index field 912. Further, an address table 901 is illustrated having a network address field 913. It should be noted that these tables preferably reside in each individual node's EEPROM 401 and have additional fields in the preferred embodiment. However, for simplicity only the above-mentioned fields are illustrated in FIG. 9. The network variable table is preferably of a structure as follows:

```
struct nv_table
{       unsigned priority:1;    /*1=priority network variable, 0=non-priority nv*/
        unsigned dir:1;         /*direction 0=input, 1=output*/
        unsigned idhi:6;        /*network variable id, most significant bits*/
        unsigned idlo;          /*network variable id, least significant bits*/
        unsigned ta:1;          /*turnaround: 1=turnaround*/
        unsigned st:2:          /*service*/
        unsigned auth:1;        /*authenticated: 1=authenticated*/
        unsigned addr:4         /*address table index*/
};
``` where the priority field indicates whether messages to update the network variable are to be sent as priority or non-priority messages; direction indicates the direction of the target ID, for example, a network variable update going from an output variable to an input variable would have the direction bit set to a 0; the network variable id is a 14 bit identification number allowing for a maximum of 16,384 unique network variables per domain in the network and corresponds to the network variable id 911 of FIG. 9; turnaround indicates an output network variable may be connected to an input network variable of the same node; service indicates whether acknowledged or unacknowledged services is utilized; auth indicates whether message are authenticated prior to being accepted and processed by identifying the sender node through an authentication process; priority indicates whether messages are transmitted as priority or normal messages; and the address table index corresponds to address table index 912 and is an index into the address table 901.

The Address Table preferably follows one of two formats given below; the first format is for group address table entries and the second format is for single destination node address table entries:

ease of use, network variables lead to generally smaller and less complicated application programs over other forms of network communication, such as prior art messaging techniques. Tables V and VI better illustrate differences between and certain advantages of use of the present invention's techniques over, for example, prior messaging techniques. Table V is a program written using network variables of the present invention. Table VI is a functionally equivalent program written using prior art messaging techniques. It is useful to note the comparative program statistics at the end of each program listing in which it is shown that the message program requires 626 bytes of ROM; 177 bytes of EEPROM; and 1314 bytes of RAM. By way of comparison, the network variables program requires only 335 bytes of ROM while using 231 bytes of EEPROM and only 1126 bytes of RAM.

SELF-IDENTIFYING STANDARD NETWORK VARIABLE TYPES

It is desirable to provide for interoperability between nodes in a network. To provide for such interoperability, it

```
struct group
{       unsigned type:1;          /*indicates whether the structure is for a group or
                                    single node*/
        unsigned size:7;          /*group size (0 for groups > 128 members*/
        unsigned domain:1;        /*domain reference*/
        unsigned member:7;        /*node's member # (0 for groups > 128 members*/
        unsigned rpttimer:4;      /*unacknowledged message service repeat timer*/
        unsigned retry:4;         /*retry count*/
        unsigned rcvtimer:4;      /*receive timer index*/
        unsigned tx_timer:4;      /*transmit timer index*/
        int group;                /*group id*/
}
struct subnetnode
{       unsigned type;            /*indicates whether the structure is for a group or
                                    single node*/
        unsigned domain:1;        /*domain reference*/
        unsigned node:7;          /*node's #*/
        unsigned rpttimer:4;      /*unacknowledged message service repeat timer*/
        unsigned retry:4;         /*retry count*/
        unsigned rsvd:4;          /*reserved*/
        unsigned tx_timer:4;      /*transmit timer index*/
        int subnet;               /*subnet*/
}
```

It should be noted here that many of the present invention's concepts of groups, domains, subnets, acknowledged messages, etc. are described in greater detail with reference to U.S. Patent Application Ser. No. 07/621,737 filed Dec. 3, 1990 titled Network Communication Protocol (the '737 application) which is assigned to the assignee of the present invention and which is incorporated herein by reference.

Continuing with the description of assigning a network variable id to a connection, block 823, the first unassigned network id is assigned to the connection and the network variable id is written to the network variable table 902 for each node using the network. Thus, in the above example, the network variable id 00000000000000$_2$ may be assigned to the connection temp1_controls of Table III; the network variable id 00000000000001$_2$ may be assigned to the connection temp2_controls of Table III; and the network variable id 00000000000010$_2$ may be assigned to the connection temp3_controls of Table III. It should be noted that network variable ids need not be unique domain wide, but only need be unambiguous within the nodes involved.

Figure 10:
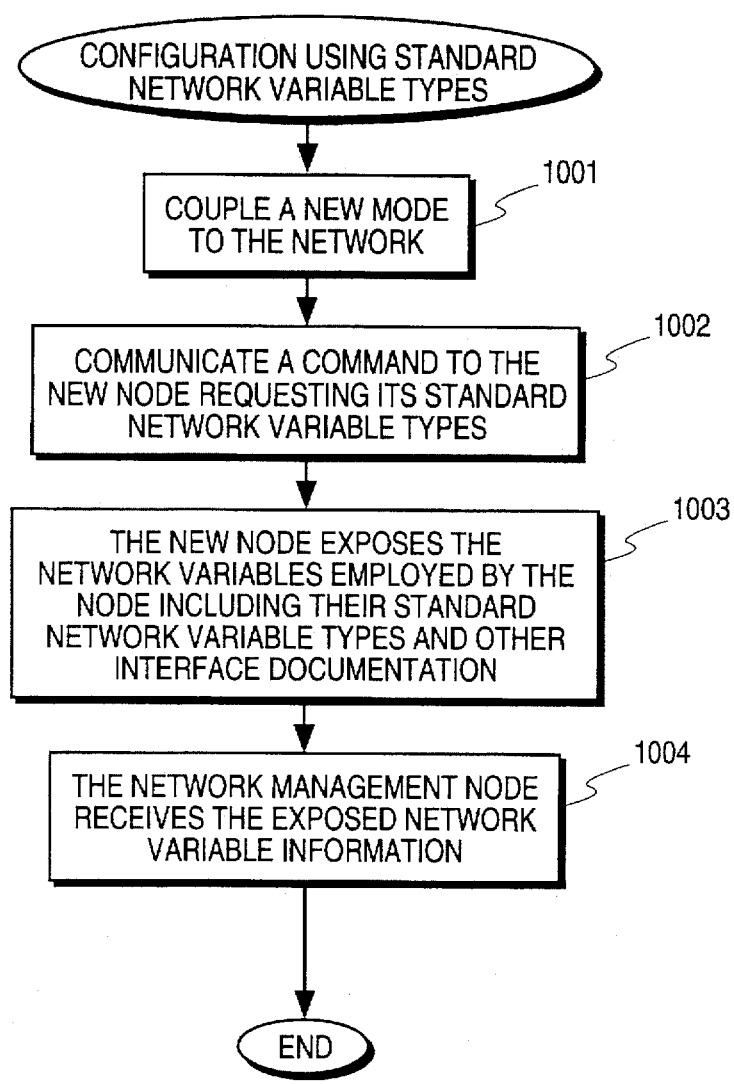
FIG. 10 is a flow diagram illustrating a method of configuring a network using standard network variable types, as may be utilized by the present invention.

Certain advantages gained through use of network variables have now been described such as the ability to automatically generate network addressing schemes from application level connections. In addition to allowing for such is necessary to assure compatibility between network variables in the various nodes of a network. To facilitate such compatibility, as one feature of the present invention, a list of standard network variable types is provided by the assignee of the present invention. The currently preferred list of standard network variable types is provided as Table VII. By utilizing the list of standard network variable types, nodes in the network may be interrogated for information on the network variables employed by the node and the network may then be configured based on this information. This process is better illustrated with reference to FIG. 10.

Initially, a node which must be configured is coupled to the network medium, block 1001. After the node is coupled to the medium, an address of the node may be determined through any number of methods. At least one of such methods is described with reference to the '737 application. After having determined an address for the node, messages may be communicated to the node over the medium. In the preferred embodiment, a network management node is coupled to the medium which is useful for configuring the network. The network management node may communicate a command to the new node requesting its information on the network variables employed by the node, block 1002, or may alternatively read such information from a file which has already been placed in the network management node's memory.

In the preferred embodiment, in order to allow for the information to be stored in the network management node's memory, such information is made available for importation into the network management node via a binder interface file (BIF). The BIF file is a byproduct of the compilation process for each node, and contains all the information necessary to install the node on the network. This information is also referred to as the exposed interface of the node.

The BIF file for a new node may by provided to the network management node prior to installation of the new node on the network in order to allow a complete network database to be constructed in advance of, and separate from, the physical installation of the new node on the network. For example, the BIF file may be supplied to the network management node on diskette, over phone lines, or on through other computer readable media.

Information equivalent to the information storm in the BIF file is also preferably storm in the memory of the node. In this case the preferred embodiment confines the application writer to use of a list of standard network variable types when developing an application program designed to run on the node. The list of standard network variable types used by the system of the preferred embodiment is enumerated in Table VII. Use of the list of standard network variables minimizes the required space for storing the exposed interface in the node's memory. Storing the exposed interface in the node's memory offers the advantage of allowing the information to be retrieved without need for the network management node to include a floppy disk drive or other device for receiving externally communicated computer readable information. However, absent the option of providing the BIF file over such an external interface, the node must be physically connected on the same network with the network management node prior to construction of the network database. In the preferred embodiment, both options are available and the choice of how the exported interface is imported into the network management node is left up to the node designer.

The file layout for the BIF file of the preferred embodiment is given in Table IX. An example of a BIF file is given in Table X. This exemplary BIF file has been generated for the program given in Table V.

As was mentioned, in the preferred embodiment nodes may utilize the standard network variable types in declaration of network variables. The information describing its network variables is communicated (or exposed) by the node to the network management node, block 1003, using standard messaging features of the network. It will be understood that in alternative embodiments, information describing other, non-standard variable types may also be communicated in a manner similar to communicating the information on standard network variables.

The network management node receives the exposed network variable information, block 1004, and may then use information, including the network variable type, in verifying valid connections and in the binding process. Only network variables of identical types may be bound together in a single connection—thus, use of standard network variable types facilitates interoperability of nodes in the network as well as facilitating identification of network variables when a command is issued to expose the network variables of a node.

As one extension to the concept of self-identifying standard network types as just described, it is possible to include in the information transmitted responsive to receiving the command to expose network variable's text strings and even graphical icons to the network management node. Such information would make the nodes largely self-documenting.

EXTENSIONS TO THE "C" LANGUAGE

The present invention has implemented certain extensions and features to the "C" programming languages to support use of network variables—these extensions include (1) the already disclosed declarations of variables as network variables and the ability to declare such variables as standard network variable types; (2) declaration and use of I/O objects; and (3) scheduling clauses. Each of these extensions will be discussed in greater detail below. It should be noted that although the extensions have been preferably implemented in the "C" programming language, the idea and concepts of these extensions are not limited to use in this programming language and, in fact, these ideas and concepts may readily be extended to other programming languages.

Network variable declarations

Figure 11:
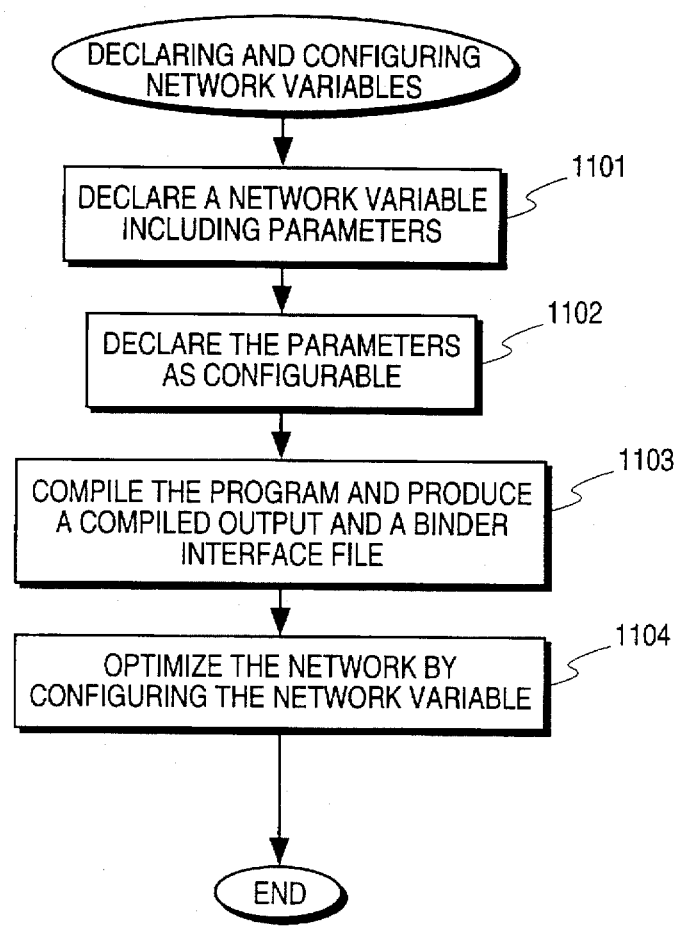
FIG. 11 is a flow diagram illustrating a method of declaring and configuring a network variable as may be used by the present invention.

As has been discussed, the present invention provides for declaration of network variables in C programs. Importantly, the declaration of network variables allows for declaring certain information for use by the above-described binding process. This process is better understood with reference to FIG. 11. Initially, a network variable is declared in a computer program intended to run on a node of the network of the present invention, block 1101. The preferred format for the declaration may be found with reference to Table VIII, below. As can be seen with reference to Table VIII, the declaration format preferably includes a set of parameters called bind_info. These parameters allow the network variable to be declared with an initial specification of protocol services. When the program is compiled, this initial information is output as pan of the BIF file. The format of the BIF file may be found with reference to Table IX. As one option in declaring network variables, these parameters may be declared as configurable or non-configurable, block 1102. In this way, a programmer programming a node may make an initial determination as to the state the parameter should normally be set to. For example, the programmer may determine in a typical configuration, a particular network variable should use acknowledged message services. However, the programmer may also allow a network administrator flexibility in configuring and optimizing the network by declaring the acknowledged parameter as configurable. The program is then compiled and a compiled output is produced in the conventional manner. In addition to producing the conventional outputs of a compiler, e.g., object cede, the compiler of the present invention produces the above-mentioned BIF file which includes information on the declared network variables such as the state of parameters and whether or not such parameters are configurable, block 1103.

During configuration of the network of the present invention, the state of these configurable parameters may be modified by the network administrator, block 1104. In the above-discussed example, the network administrator may determine the network will be optimally configured if the variable declared as acknowledged is actually configured as unacknowledged and repeated. It is worthwhile to again refer to FIG. 8(a) which illustrates, in addition to other steps in the connection process, the step of setting parameters for the connection, block 806. The parameters which are settable in this step of the configuration process are those parameters declared as configurable in the network variable declarations. These parameters are displayed on a display screen during the configuration process and may be modified by changing the state of the parameters on the display screen. For example, one of three states may be set to tell the network the type of service to be used for a network variable—unacknowledged, unacknowledged and repeated, and acknowledged. The authentication feature may be set to an on state in which message authentication is used or to an off state in which message authentication is not used. Also, network variable may be set to a priority state or a non-priority state indicating whether messages associated with the variable are to be sent as priority messages or as normal messages.

Declaration and use of Objects

Each node of the present invention comprises its own scheduler, timers, and logical I/O devices. The "C" programming language employed by the present invention provides access to these devices through use of predefined objects; namely, an event scheduler which handles task scheduling for the node, timer objects which provide both millisecond and second timers, and I/O objects which provide for declaration of a number of logical I/O devices. Importantly, once declared a logical link is created between the object name and the physical device and references may be made to the object name to gain access to the physical device.

Declaration and use of objects will be discussed in greater detail by referring to declaration of I/0 objects. Each node of the network of the present invention has a number of built-in electrical interface options for performing input and output. Prior to performing input or output, a program must declare an I/0 object which interfaces with one of eleven I/0 pins on the node; three serial pins 441 and eight parallel pins 445. The eleven pins are referred to with the reserved pin names: IO__0, IO__1, IO__2, IO__3, IO__4, IO__5, IO__6, IO__7, IO__8, IO__9, and IO__10. The declaration syntax for an I/O object and use of the eleven pins in the present invention is discussed further with reference to Table XI.

Figure 12:
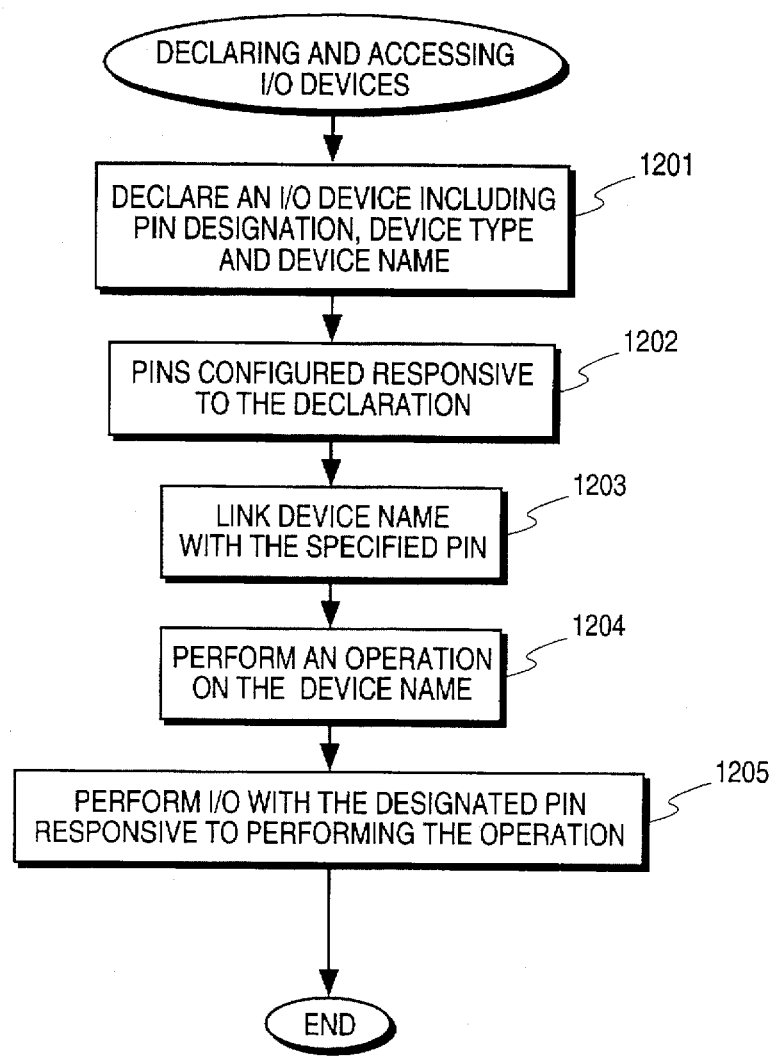
FIG. 12 is a flow diagram illustrating a method of declaring and accessing I/O devices as may be utilized by the present invention.

It is worthwhile to turn to FIG. 12 to discuss this concept in somewhat greater detail. Initially, a program statement is coded to declare an I/O device giving a pin designation, a device type and a device name; when the program is compiled the declaration statement causes declaration of the I/O device, block 1201. Other parameters and the format of the declaration for an I/O device in the preferred embodiment may be found with reference to Table XI. Responsive to declaring the I/O device, the pins are configured to perform the function specified by the device type, block 1202. The device types of the preferred embodiment may be found with reference to Table XI.

This process is further illustrated with reference to the exemplary network variable program of Table V and the associated assembly language code resulting from a compile of the program given in Table XIV. As can be seen with reference to the program source code in Table V, two I/O devices are declared, IO__0 as a bit output named MotorCtrl and IO__5 as a pulsecount input named pulseamps.

The specified device name is logically associated with the specified device to perform the designated I/O, block 1204. In this way, a reference may be simply made to the device name to accomplish the designated I/O with necessity of continued reference to specific pins and without need for special coding to implement the desired device types. As can be seen with reference to Table XII, built-in functions are provided to allow communication with the I/O devices. One of the built-in functions may be used to perform the built-in function referring to the desired device name to specify a hardware device, block 1204. The desired I/O is then performed in accordance with the device type specified in the device declaration, block 1205.

Scheduling

Scheduling on a node in the present invention is event driven. When a given condition becomes true, a body of code termed a task associated with that condition is executed. In the preferred embodiment, scheduling is accomplished through "when" statements. The syntax of a when statement of the preferred embodiment is given in Table XIII. An example of a when statement is given below:

```
when (timer_expires (led_timer))   /* This line is the when clause  */
{
    io_out (led, OFF);             /* This is the task - turn the led off */
}
```

In the above example, when the application timer led_timer expires, the body of code following the when statement is executed (and the LED is turned off). When statements provide for execution of a task (the bracketed code) when the condition specified (e.g., the led_timer expires) evaluates to true. It is known in the art to provide structures in programming languages which allow for conditional execution of a task when a statement evaluates to true. However, in known systems which include a scheduling statement (a when statement or the equivalent), the event which is evaluated is a predefined event. As is noted in Table XIII, the present invention provides for use of predetermined events in scheduling statements. However, as one important aspect of the present invention, events may also be any valid C expression. For example, the following statement may be coded in a system of the present invention:

```
when (x == 3)          /* This line is the when clause         */
{
    io_out (led, OFF);  /* This is the task - turn the led off */
}
```

In this case, whenever the event x==3 occurs, the LED is mined off. Of course, significantly more complicated C programing statements may be envisioned to define an event. As will be understood by one of ordinary skill in the art, allowing evaluation of any valid language expression to define an event offers significant flexibility over known systems. The present invention further allows for use of multiple when statements to be associated with a single task. For example:

```
when (powerup)                      /* This line is one when clause      */
when (reset)                        /* This line is another when clause */
when (io_changes(io_switch))        /* This line is another when clause */
when (x = 3)                        /* This line is another when clause */
{
    io_out (led, OFF);              /* This is the task - turn the led off */
}
```

In this case, when any of the above events evaluates to true, the task is executed—e.g., the LED is turned off.

Importantly, as one aspect of the present invention, I/O objects may be referred to in an event clause allowing improved ease of programming of the system of the present invention. For example, two methods may be used to determine if an input value is new: (1) the io_update_occurs event may be used, referring to the desired device in a when statement or the io_in function may be used. The below two programs accomplish the same goal.

PROGRAM 1

```
IO_5 input pulsecount dev;
when (io_update_occurs (dev))
    {
        /* perform the desired function */
    }
```

PROGRAM 2

```
stimer t;
IO_5 input pulsecount dev;
when (timer_expires(t))
    { io_in (dev);
      if (input_is_new)
        {
            /* perform the desired function */
        }
    }
```

The particular method chosen will depend on the individual case; however, the above is exemplary of the flexibility and ease of use of the system of the present invention.

Further, as an additional feature of the present invention and as is described with reference to Table VIII, the present invention provides for two levels of when clauses, priority when clauses and normal when clauses. Using this feature, it is possible to handle events which must be dealt with on a priority basis.

PERFORMANCE OPTIMIZATIONS PERFORMED BY THE BINDER OF THE PREFERRED EMBODIMENT

As was discussed above, when more than two nodes are used in a connection, the nodes may be recognized as a group and a group address may be assigned to the group of nodes.

The preferred embodiment also carries out other performance optimization routines to achieve minimal network traffic with resulting optimized response time. For example, the binder determines optimal protocol service class and addressing allocation at the time of binding variables in order. Illustrative of this, with reference to FIG. 3(b), three separate connections are shown, 321–323. Although this represents a typical optimal configuration, these three connections could be combined by the binder into a single group resulting in nodes sometimes receiving messages about network variable updates which are not used by those nodes. In such a configuration, although there are additional messages received by the nodes, no effect is seen by the application running on the node because the network variable messages include a 14-bit network variable identification. Therefore, nodes which have no need for a variable sent to them simply discard and, in the case of acknowledged service, acknowledge the message.

An advantage of grouping many nodes in a single group in the system of the preferred embodiment is that such grouping simplifies tasks for the binder process and further uses only one group address (the preferred embodiment is limited to 255 group addresses per domain).

Further, the binder of the present invention dynamically selects an optimal protocol class of service at the time of binding. This is done messages it would take to complete a transaction on the first using acknowledged service (including the original message and the acknowledgements). (Note that this number is the group size which is known by the network variable binder process at the beginning of the connection process). Second, this number is compared with the repeat count for repeating message. If the repeat count is less than the group size, and none of the programs require acknowledged services (each program allows the config option for its network variables), then the binder dynamically converts the service from acknowledged to unacknowledged repeat. This reduces network traffic, thus improving response time.

Thus, an improved communication network having capability for communication of information between nodes in the network is described.

TABLE I

```
/*****************************************************************/
/**                                                             **/
/** Temperature sensor control program writes an output network variable **/
/** temp_high responsive to changes in temperature sensed by a thermostat **/
/**                                                             **/
/*****************************************************************/

/** I/O Declarations **/

IO_1 input bit temp_in;

/ Network variables declaration / network output boolean temp_high;

/ working variables declarations and initializations / int on_threshold = 72;
int off_threshold = 68;

/*****************************************************************/
/**                                                             **/
/** Event driven code; update temp_high responsive to changes in temperature **/
/** input to the program by temp_in                              **/
/**                                                             **/
/*****************************************************************/ when (powerup)
when (reset)
    {
       io_change_init (temp_in);
    } when (io_changes(temp_in))
    {
       if (temp_in > on_threshold)
              temp_high = true;
       if (temp_in < off_threshold)
              temp_high = false;
    }
```

TABLE II

```
/******************************************************************/
/**                                                              **/
/**  Fan control program reads an input network variable fan_on to control  **/
/**  turning a fan on and off using output bit fan_active.       **/
/**                                                              **/
/******************************************************************/

/** I/O Declarations **/

IO_1 output bit fan_active;

/ Network variables declaration / network input boolean fan_on;

/******************************************************************/
/**                                                              **/
/** Event driven code; updates fan_active each time a change in state occurs **/
/** for the network variable fan_on                              **/
/**                                                              **/
/******************************************************************/ when (nv_update_occurs(fan_on))
   {
   io_out(fan_active, fan_on);
   }
```

TABLE III

```
###################################################################
#                                                                 #
# This connection associates the temperature sensor control output variables   #
# (temp_high) to a fan control input variable (fan_on).  Specifically, temperature #
# sensor 1 is connected to fan 1; temperature sensor 2 is connected to fan 1 and  #
# and fan 2; and temperature sensor 3 is connected to fan 2.      #
#                                                                 #
###################################################################

@N (temp1_controls)
temp_sensor_1.temp_high          /** writer **/
fan_1.fan_on                     /** reader **/

@N (temp2_controls)
temp_sensor_2.temp_high          /** writer **/
fan_1.fan_on                     /** reader **/
fan_2.fan_on                     /** reader **/

@N (temp3_controls)
temp_sensor_3.temp_high          /** writer **/
fan_2.fan_on                     /** reader **/
```

TABLE IV

```
###################################################################
#                                                                 #
# This connection associates the temperature sensor control output variables #
# (temp_high) to a control cell; the control cell is connected to fan control #
# input variable (fan_on).  Specifically, temperature sensor 1 is connected to #
# control cell 1; temperature sensor 2 is connected to control cell 1 and control #
# cell 2; temperature sensor 3 is connected to control cell 2; control cell 1 is #
# connected to fan 1; and control cell 2 is connected to fan 2    #
#                                                                 #
###################################################################

@N (connection_1)
temp_sensor_1.temp_high            /** writer **/
cell_1.temp_high                   /** reader **/

@N (connection_2)
temp_sensor_2.temp_high            /** writer **/
cell_1.temp_high                   /** reader **/
cell_2.temp_high                   /** reader **/

@N (connection_3)
temp_sensor_3.temp_high            /** writer **/
cell_2.temp_high                   /** reader **/

@N (connection_4)
cell_1.fan_on                      /** writer **/
fan_1.fan_on                       /** reader **/

@N (connection_5)
cell_2.fan_on                      /** writer **/
fan_2.fan_on                       /** reader **/
```

TABLE V

NETWORK VARIABLE PROGRAM EXAMPLE

```
#pragma receive_trans_count 8

/* This example has all the setpoint configuration local to this node.      */
/* In this way, generic temperature and pressure sensors can be used         */
/* which have no knowledge of the setpoints. They only report new temp       */
/* values when the old one changes by a threshold value. Additionally,       */
/* the temperature value can be reported to many nodes which can each        */
/* use the temperature for their specific function -- even applying          */
/* different set points to the temperature value. In the old study,          */
/* actual temperature values were not sent on the network. Messages          */
/* were sent for above high setpoint, at setpoint & below low setpoint.      */
/* Since no temperature values were sent, the messages sent could only       */
/* be used by this node -- defeating the value of a networked approach       */
/* This division of function in the old study was done to save EEPROM        */
/* in this node since storing the setpoints takes EEPROM.                    */ define true            1
define false           0
#define on              true
define off             false typedef signed int fahrenheit;
typedef signed int PoundsPerSqIn;

struct tempSetpoints
        {
                fahrenheit LowSet,
                HighSet;
        };

struct pressureSetpoints
        {
                PoundsPerSqIn       LowSet,
                                    HighSet;
        };

/* EEPROM nodal configuration parameters: Minimum time the motor must        */
/* remain on, minimum time the motor must remain off. Temperature &          */
/* pressure setpoints. Location and device type, too!!                       */
```

```
config network input
        signed long int      MinOffTime,
                             MinOnTime;

config network input
        struct tempSetpoints OutletWater,
                             CndnsrHead,
                             CoolAir;

config network input
        struct pressureSetpoints  CmprssrInltGas;

#pragma set_id_string "HVAComp"

/* Network variable declarations for temperature & pressure inputs */
/* used to decide when the motor should be turned on and off       */ network  input  fahrenheit   OutletWaterTemp,
                             CndnsrHeadTemp,
                             CoolAirTemp;

network  input  PoundsPerSqIn   CmprssrGasPrssr;

network  input  boolean      BuildingCooling;

/* Network variable declarations used to report status to the HVAC  */
/* system controller. Reported conditions are: node offline/online, */
/* motor on/off, and motor overloaded/O.K. These conditions are only */
/* reported when they change.                                        */ network  output  boolean     MotorOn,
                             MotorOverload,
                             AmOnline;

/* Definitions of the Neuron® I/O pins. The previous study used an  */
/* onchip AtoD to measure the current that the motor used. This version */
/* uses a $.50 external AtoD to convert current to a number of pulses   */
/* over a 1 second interval. These pulses are accumulated via the on    */
/* chip timer/counter block to determine the current the motor uses     */

IO_0  output  bit            MotorCtrl;
IO_5  input   pulsecount     PulseAmps;

/* Timer declarations take no EEPROM space -- they are in RAM       */
```

```
 1  stimer       MinOffTimer,
 2               MinOnTimer,
 3               MotorMeasurementTimer;
 4
 5  /* number of pulses that equal the maximum amount of current the motor   */
 6  /* can draw. The cheap AtoD gives O to 255 pulses per second depending   */
 7  /* on the analog current value.                                          */
 8
 9  const  int   CompressorMotorMaxDraw=180,
10               MeasurementInterval=10;
11
12  int          strikes;    /* motor overdraw counter        */
13
14  /* now for some real code! initialization for reset, powerup and online  */
15  /* events. Online means the node received a network management message   */
16  /* to go online.                                                         */
17
18  void motor(boolean on_off_flag)
19  {
20      MotorOn = on_off_flag;
21      io out(MotorCtrl, on_off_flag);
22
23      if (on_off_flag == on)
24      MinOnTimer = MinOnTime;
25      else
26      MinOffTimer = MinOffTime;
27  }
28
29  void control_action()
30  {
31  if ( AmOnline                                                      &&
32       BuildingCooling                                               &&
33       MinOffTimer                    ==    0                        &&
34       OutletWaterTemp                 >    OutletWater.HighSet      &&
35       CndnsrHeadTemp                  <    CndnsrHead.LowSet        &&
36       CmprssrGasPrssr                 <    CmprssrInltGas.LowSet    &&
37       CoolAirTemp                     >    CoolAir.HighCet
38     )
39           {
40              motor(on);
41           }
42  else
43           {
44              if (   BuildingCooling                            &&
45                     MinOnTimer       ==   0                    &&
46                     OutletWaterTemp < OutletWater.LowSet       &&
```

```
                    CndnsrHeadTemp  > CndnsrHead.HighSet      &&
                    CmprssrGasPrssr > CmprssrInltGas.HighSet  &&
                    CoolAirTemp     < CoolAir.LowSet
            )
            {
                    motor(off);
            {
    }
} when (reset)
        {
                MotorOn =       false;
                MotorOverload =         false;
                AmOnline =      true;
                motor(off);

/* initialize all input variables so that other nodes    */
        /* don't have to all update this one before this one     */
        /* begins operation.                                     */

OutletWaterTemp   =     OutletWater.LowSet;
                CndnsrHeadTemp    =     CndnsrHead.LowSet;
                CoolAirTemp       =     CoolAir.LowSet;
                CmprssrGasPrssr   =     CmprssrInltGas.LowSet;

strikes =       0;

poll(BuildingCooling);   /* ask the controller if AC is on    */

} when (online)
        {
                AmOnline  =     true;
                motor(off);

/* if the motor was overloaded & and we just came back online   */
        /* perhaps someone repaired it                                  */

MotorOverload = false;
        } when(offline)
        {
```

```
             AmOnline       =       false;
             motor(off);
        } when   ( nv update occurs )
       {
       control action();
       } when ( timer expires(MotorMeasurementTimer) )
       {
              MotorMeasurementTimer = MeasurementInterval;

if ( io_in(PulseAmps) > CompressorMotorMaxDraw)
              {
                     if (++strikes >= 3)        /* motor is really overloaded */
                     {
                            motor(off);
                            MotorOverload       =       true;
                     }
                     else
                            strikes = 0
              }

Link Memory Usage Statistics:
ROM Usage: User Code & Constant Data        335 bytes EEPROM Usage: (not necessarily in order of physical layout)
System Data & Parameters                         72 bytes
Domain & Address Tables                         105 bytes
Network Variable Config Tables                   42 bytes
User EEPROM Variables                            12 bytes
User Code & Constant Data                         0 bytes
Total EEPROM Usage                              231 bytes RAM Usage:    (not necessarily in order of physical layout)
System Data & Parameters                        549 bytes
Transaction Control Blocks                      132 bytes
User Timers & I/O Change Events                  12 bytes
Network & Application Buffers                   424 bytes
User RAM Variables                                9 bytes
Total RAM Usage                                1126 bytes End of Link Statistics
```

TABLE VI

MESSAGING PROGRAM EXAMPLE

```
#pragma receive_trans_count 8

/* This example has all the setpoint configuration local to this node.      */
/* In this way, generic temperature and pressure sensors can be used        */
/* which have no knowledge of the setpoints. They only report new temp      */
/* values when the old one changes by a threshold value. Additionally,      */
/* the temperature value can be reported to many nodes which can each       */
/* use the temperature for their specific function -- even applying         */
/* different set points to the temperature value. In the old study,         */
/* actual temperature values were not sent on the network. Messages         */
/* were sent for above high setpoint, at setpoint & below low setpoint.     */
/* Since no temperature values were sent, the messages sent could only      */
/* be used by this node -- defeating the value of a networked approach      */
/* This division of function in the old study was done to save EEPROM       */
/* in this node since storing the setpoints takes EEPROM.                   */ define true              1
define false             0
#define on                true
define off               false /* Add In some message codes */ define CondensrTemp      0        /* net in condensor temp         */
define CoolTemp          1        /* net in air temp               */
#define GasPress          2        /* net in gas pressure           */
#define BldCool           3        /* net in building cooling stat  */
#define MotOn             4        /* net out cmprsr mot on         */
#define MotOvld           5        /* net out cmprsr mot overload   */
#define NdOnline          6        /* net out online                */
#define Poll BldCool      7        /* poll building status          */
#define TimeMinOff_c      8        /* Config Msg code for time off  */
#define TimeMinOn_c       9        /* Config Msg code for time on   */
#define OutletH20         10       /* Net in H20 temperature        */
#define CndnsrHd_c        11       /* cndsr head temp config        */
#define ColdAir_c         12       /* Cold air temp config          */
#define CompGasPress_c    13       /* gass pressure config          */
#define OutletH20_c       14       /*Config Msg code for water tmp  */
```

```
typedef signed int fahrenheit;
typedef signed int PoundsPerSqIn;

struct tempSetpoints
    {
            fahrenheit LowSet,
                       HighSet;
    };

struct pressureSetpoints
    {
            PoundsPerSqIn LowSet,
                          HighSet;
    };

/* EEPROM nodal configuration parameters: Minimum time the motor must    */
/* remain on, minimum time the motor must remain off. Temperature &      */
/* pressure setpoints. Location and device type, too!!                   */ signed   long  int    MinOffTime,
                      MinOnTime;

struct  tempSetpoints      OutletWater,
                           CndnsrHead,
                           CoolAir;

struct  pressureSetpoints  CmprssrInltGas;

#pragma set_id_string "HVAComp"

/* Network variable declarations for temperature & pressure inputs */
/* used to decide when the motor should be turned on and off       */ fahrenheit         OutletWaterTemp,
                   CndnsrHeadTemp,
                   CoolAirTemp;

PoundsPerSqIn      CmprssrGasPrssr;

boolean            BuildingCooling;

/* Network variable declarations used to report status to the HVAC */
/* system controller. Reported conditions are: node offline/online, */
/* motor on/off, and motor overloaded/O.K. These conditions are only */
/* reported when they change.*/
```

```
boolean     MotorOn,
            MotorOverload,
            AmOnline;

/* Definitions of the Neuron® I/O pins. The previous study used an */
/* onchip AtoD to measure the current that the motor used. This version */
/* uses a $.50 external AtoD to convert current to an number of pulses */
/* over a 1 second interval. These pulses are accumulated via the on */
/* chip timer/counter block to determine the current the motor uses */

IO_0 output bit MotorCtrl;
IO_5 input pulsecount PulseAmps;

/* Timer declarations */ stimer      MinOffTimer,
            MinOnTimer,
            MotorMeasurementTimer;

/* number of pulses that equal the maximum amount of current the motor */
/* can draw. The cheap AtoD gives 0 to 255 pulses per second depending */
/* on the analog current value.*/ const int   CompressorMotorMaxDraw=180,
            MeasurementInterval=10;

int strikes; /* motor overdraw counter*/

/* Define all the message tags */ msg     tag     air_temp_in;
msg     tag     gas_press_in;
msg     tag     bldstate_in;
msg     tag     motIsOn_out;
msg     tag     motIsOvrld_out;
msg     tag     Im_onln_out;
msg     tag     getBldState;
msg     tag     config_msg;
msg     tag     water_temp_in;
msg     tag     cndsr_temp_in;

/* now for some real code! initialization for reset, powerup and online */
/*events. Online means the node received a network management message */
/* to go online.                                                      */
```

```
1   void motor(boolean on_off_flag)
2       {
3           MotorOn              = on_off_flag;
4           io_out(MotorCtrl, on_off_flag);
5           msg_out.tag          =        motIsOn_out;
6           msg_out.code         =        MotOn;
7           msg_out.data[0]      =        MotorOn;
8           msg_send();
9
10          if (on_off_flag == on)
11              MinOnTimer =         MinOnTime;
12          else
13              MinOffTimer =        MinOffTime;
14      }
15
16  void control_action()
17      {
18          if (   AmOnline                                           &&
19              BuildingCooling                                       &&
20              MinOffTimer == 0                                      &&
21              OutletWaterTemp > OutletWater.HighSet                 &&
22              CndnsrHeadTemp < CndnsrHead.LowSet                    &&
23              CmprssrGasPrssr < CmprssrInltGas.LowSet               &&
24              CoolAirTempt > CoolAir.HighSet
25          )
26          {
27              motor(on);
28          }
29
30          else
31          {
32
33              if (   BuildingCooling                                &&
34                  MinOnTimer == 0                                   &&
35                  OutletWaterTemp < OutletWater.LowSet              &&
36                  CndnsrHeadTemp > CndnsrHead.HighSet               &&
37                  CmprssrGasPrssr > CmprssrInltGas.HighSet          &&
38                  CoolAirTemp < CoolAir.LowSet
39              )
40              {
41                  motor(off);
42              }
43          }
44
45
46
```

```
when (reset)
    {
            MotorOn           =       false;
            MotorOverload     =       false;
            AmOnline          =       true;

msg_out.tag       =       motIsOn_out;
            msg_out.code      =       MotOn;
            msg_out.data[0]   =       MotorOn;
            msg_send();

msg_out.tag       =       motIsOvrld_out;
            msg_out.code      =       MotOvld;
            msg_out.data[0]   =       MotorOverload;
            msg_send();

msg_out.tag       =       Im_onln_out;
            msg_out.code      =       NdOnline;

msg_out.data[0]   =       AmOnline;
            msg_send();

motor(off);

/* initialize all input variables so that other nodes */
    /* don't have to all update this one before this one*/
    /* begins operation.*/

OutletWaterTemp   =       OutletWater.LowSet;
            CndnsrHeadTemp    =       CndnsrHead.LowSet;
            CoolAirTemp       =       CoolAir.LowSet;
            CmprssrGasPrssr   =       Cmprssr~nlLGa~.~owSet;

strikes           =       0;

msg_out.tag       =       getBldState;
            msg_out.code      =       Poll BldCool;
            msg_out.service   =       REQUEST;
            msg_send();
    }
```

```
when(online)
    {
            AmOnline          =      true;
            msg_out.tag       =      Im_onln_out;
            msg_out.code      =      NdOnline;
            msg_out.data[0]   =      AmOnline;
            msg_send();
            motor(off);

/* if the motor was overloaded & and we just came back online */
    /* perhaps someone repaired it*/

MotorOverload     =      false;
            msg_out.tag       =      motIsOvrld_out;
            msg_out.code      =      MotOvld;
            msg_out.data[0]   =      MotorOverload;
            msg_send();
    } when (offline)
    {
            AmOnline          =      false;
            msg_out.tag       =      Im_onln_out;
            msg_out.code      =      NdOnline;
            msg_out.data[0]   =      AmOnline;
            motor(off);
    } when ( msg_arrives(CondensrTemp) )
    {
            CndnsrHeadTemp =   (msg_in.data[0]<<8) + msg_in.data[1];
            control_action();
    } when(msg_arrives(CoolTemp))
    {
            CoolAirTemp =(msg_in.data[0]<<8) + msg_in.data[1];
            control_action();
    } when ( msg_arrives(GasPress))
    {
            CmprssrGasPrssr =  (msg_in.data[0]<<8) + msg_in.data[1];
            control_action();
    }
```

```
 1  when ( msg_arrives(BldCool))
 2      {
 3              BuildingCooling    =    msg_in.data[0];
 4              control_action();
 5      }
 6
 7  when ( msg_arrives(OutletH20))
 8      {
 9              OutletWaterTemp =    (msg_in.data[0]<<8) + msg_in.data[1];
10              control_action();
11      }
12
13  when ( msg_arrives(TimeMinOff_c))
14      {
15              MinOffTime    =    (msg_in.data[0]<<8) + msg_in.data[1];
16      }
17
18  when ( msg_arrives(TimeMinOn_c))
19      {
20              MinOnTime    =    (msg_in.data[0]<<8) + msg_in.data[1];
21      }
22
23  when ( msg arrives(CndnsrHd_c)
24      {
25              CndnsrHead.LowSet    =    (msg_in.data[0]<<8) + msg_in.data[1];
26              CndnsrHead.HighSet   =    (msg_in.data[2]<<8) + msg_in.data[3];
27      }
28
29  when ( msg_arrives(ColdAir_c))
30      {
31              CoolAir.LowSet  =    (msg_in.data[0]<<8) + msg_in.data[1];
32              CoolAir.HighSet =    (msg_in.data[2]<<8) + msg_in.data[3];
33      }
34
35  when ( msg_arrives(CompGasPress_c))
36      {
37              CmprssrInltGas.LowSet =    (msg_in.data[0]<<8) + msg_in.data[1];
38              CmprssrInltGas.HighSet =   (msg_in.data[2]<<8) + msg_in.data[3];
39      }
40
41  when ( msg_arrives(OutletH20_c))
42      {
43              OutletWater.LowSet =    (msg_in.data[0]<<8) + msg_in.data[1];
44              OutletWater.HighSet =   (msg_in.data[2]<<8) + msg_in.data[3];
45      }
46
```

```
1   when ( timer_expires(MotorMeasurementTimer) )
2       {
3              MotorMeasurementTimer = MeasurementInterval;
4
5
6           if ( io_in(PulseAmps) > CompressorMotorMaxDraw)
7              {
8                   if (++strikes >= 3) /* motor is really overloaded */
9                   motor(off);
10                  MotorOverload         =        true;
11                  msg_out.tag    =        motIsOvrld out;
12                  msg_out.code =         MotOvld;
13                  msg_out.data[0]       =        MotorOverload;
14                  msg_send();
15             }
16         else
17             strikes = 0;
18      }
19
20  Link Memory Usage Statistics:
21  ROM Usage: User Code & Constant Data        626 bytes
22
23  EEPROM Usage: (not necessarily in order of physical layout)
24  System Data & Parameters                     72 bytes
25  Domain & Address Tables                     105 bytes
26  Network Variable Config Tables                0 bytes
27  User EEPROM Variables                         0 bytes
28  User Code & Constant Data                     0 bytes
29  Total EEPROM Usage                          177 bytes
30
31  RAM Usage:     (not necessarily in order of physical layout)
32  System Data & Parameters                    549 bytes
33  Transaction Control Blocks                  132 bytes
34  User Timers & I/O Change Events              12 bytes
35  Network & Application Buffers               600 bytes
36  User RAM Variables                           21 bytes
37  Total RAM Usage                            1314 bytes
38
39  End of Link Statistics
40
41
```

TABLE VII
STANDARD NETWORK VARIABLE TYPES

| # | Name | Quantity | Units | Range | Bits | Resolution |
|---|------|----------|-------|-------|------|------------|
| 1 | SNVT_amp | current | amps | -3,276 - 3276 | 16 | 0.1 ampere |
| 2 | SNVT_amp_mil | current | milliAmps | -3,276 - 3276 | 16 | 0.1 milliampere |
| 3 | SNVT_angle | phase/rotation | radians | 0 - 65 | 16 | 0.001 radian |
| 4 | SNVT_angle_vel | angular velocity | radians/sec | 3,276 - 3276 | 16 | 0.1 radians/sec |
| 5 | SNVT_char_ascii | character | character | 0 - 255 | 8 | 1 character |
| 6 | SNVT_count | count,event | counts | 0 - 65,535 | 16 | 1 count |
| 7 | SNVT_count_inc | incremental counts | counts | -32,768 - +32,767 | 16 | 1 count |
| 8 | SNVT_date_cal | date | YYYY,MM,DD | 1-3000,0-12,0-31, | 32 | 1 day |
| 9 | SNVT_date_day | day of Week | Enum list | M,Tu,W,Th,F,Sa,Su | 8 | N/A |
| 10 | SNVT_date_time | time of day | HH:MM:SS | 00:00:00 to 23:59:59 | 24 | 1 second |
| 11 | SNVT_elec_kwh | energy, elec | Kilowatt-Hours | 0 - 65,535 | 16 | 1 KWH |
| 12 | SNVT_elec_whr | energy, elec | watt-hours | 0 - 6,553 | 16 | 0.1 WHR |
| 13 | SNVT_flow_mil | flow | milliters/sec | 0 - 65,535 | 16 | 1ml/s |
| 14 | SNVT_length | length | meters | 0 - 6,553 | 16 | 0.1m |
| 15 | SNVT_length_kilo | length | kilometers | 0 - 6,553 | 16 | 0.1km |
| 16 | SNVT_length_micr | length | microns | 0 - 6,553 | 16 | 0.1km |
| 17 | SNVT_length_mil | length | millimeters | 0 - 6,553 | 16 | 0.1mm |
| 18 | SNVT_lev_contin | level, contin | percent | 0 - 100% | 8 | .5% |
| 19 | SNVT_lev_disc | level, discrete | Enumerated list | | 8 | N/A |
| 20 | SNVT_mass | mass | grams | 0 - 6,553 | 16 | 0.1g |
| 21 | SNVT_mass_kilo | mass | kilograms | 0 - 6,553 | 16 | 0.1kg |
| 22 | SNVT_mass_mega | mass | metric tons | 0 - 6,553 | 16 | 0.1 tone |
| 23 | SNVT_mass_mill | mass | milligrams | 0 - 6,553 | 16 | 0.1mg |
| 24 | SNVT_power | power | watts | 0 - 6,553 | 16 | 0.1 watt |
| 25 | SNVT_power_kilo | power | watts | 0 - 6,553 | 16 | 0.1 kwatt |
| 26 | SNVT_ppm | concentration | ppm | 0-65,535 | 16 | 1ppm |
| 27 | SNVT_press | pressure | pascals | -32,768 - 32,767 | 16 | 1 pascal |
| 28 | SNVT_press_psi | pressure | lbs/sq-in | -3,276 - 3,276 | 16 | 0.1 psi |
| 29 | SNVT_res | resistance | Ohms | 0 - 6,553 | 16 | 0.1 Ohm |
| 30 | SNVT_res_kilo | resistance | kiloOhms | 0 - 6,553 | 16 | 0.1 kilo-Ohm |
| 31 | SNVT_sound_db | sound Level | dBspl | -327 - 327 | 16 | 0.01 dB |
| 32 | SNVT_speed | speed | meters/second | 0 - 655 | 16 | 0.01m/s |
| 33 | SNVT_speed_kmh | speed | km/hour | 0 - 655 | 16 | 0.01 km/h |
| 34 | SNVT_state_supr | sensor state | Enumerated list | | 8 | N/A |
| 35 | SNVT_str_asc | char string | ASCII characters(s) | 30 characters | 248 | N/A |
| 36 | SNVT_str_int | char string | Int'l char set (s) | 14 characters | 248 | N/A |

| #  | Name            | Quantity     | Units           | Range          | Bits | Resolution      |
|----|-----------------|--------------|-----------------|----------------|------|-----------------|
| 37 | SNVT_telecom    | phone state  | Enumerated list |                | 8    | N/A             |
| 38 | SNVT_temp       | temperature  | Celsius         | -3,276 - +3,276| 16   | 0.1 degree      |
| 39 | SNVT_time_passed| elapsed time | HH:MM:SS:LL     | 0 - 65,536     | 48   | 0.001 sec       |
| 40 | SNVT_vol        | volume       | liters          | 0 - 6,553      | 16   | 0.1 liter       |
| 41 | SNVT_vol_kilo   | volume       | kiloliters      | 0 - 6,553      | 16   | 0.1 kiloliter   |
| 42 | SNVT_vol_mil    | volume       | milliliters     | 0 - 6,553      | 16   | 0.1 milliliter  |
| 43 | SNVT_volt       | voltage      | volts           | -3,276 - 3,276 | 16   | 0.1 volt        |
| 44 | SNVT_volt_dbmv  | voltage      | dB microvolts   | -327 - 327     | 16   | 0.01 db uv dc   |
| 45 | SNVT_volt_kilo  | voltage      | kilo volts      | -3,276 - 3,276 | 16   | 0.1 kilovolt    |
| 46 | SNVT_volt_mil   | voltage      | millivolts      | -3,276 - 3,276 | 16   | 0.1 millivolt   |

TABLE VIII

NETWORK VARIABLE DECLARATION

The preferred syntax for declaration of a network variable is as follows:

network input | output [netvar modifier] [class] type [bind_info (fields)] identifier;

where:

netvar modifier      are the following optional modifiers which can be included in the declaration of a network variable:

*sync / synchronized* — specifies that all values assigned to this network variable must be propagated, and in their original order. However, if a synchronous network variable is updated multiple times within a single critical section, only the last value is sent out. If this keyword is omitted from the declaration, the scheduler does not guarantee that all assigned values will be propagated. For example, if the variable is being modified more rapidly than its update events can be processed, the scheduler may discard some intermediate data values. However, the most recent data value for a network variable will never be discarded.

*polled* — is used only for output network variables and specifies that the value of the output network variable is to be sent only in response to a poll request from a node which reads the network

|   |       |                                                                                           |
|---|-------|-------------------------------------------------------------------------------------------|
| 1 |       | variable. When this keyword is omitted, the value is propagated                           |
| 2 |       | over the network every time the variable is assigned a value.                             |
| 3 |       |                                                                                           |
| 4 | class | Certain classes of storage may be specified for network variables.                        |
| 5 |       | Specifically, the following keywords may be entered in the network                        |
| 6 |       | variable declaration statement:                                                           |
| 7 |       | *const* — specifies that the network variable may not be changed by                       |
| 8 |       | the application program;                                                                  |
| 9 |       | *eeprom* — allows the application program to indicate the value of                        |
| 10|       | the network variable is to be preserved across power outages. In the                      |
| 11|       | preferred embodiment, variables declared with this storage class are                      |
| 12|       | stored in the eeprom 401. EEPROM variables have a limited                                 |
| 13|       | capability to accept changes before the EEPROM can no longer be                           |
| 14|       | guaranteed to operate properly. Therefore, initializers for the                           |
| 15|       | eeprom class take effect when the program is loaded and not each                          |
| 16|       | time the program is started. Reloading a program has the effect of                        |
| 17|       | reinitializing all eeprom variables.                                                      |
| 18|       | *config* — specifies a const network variable in EEPROM that can                          |
| 19|       | be changed only by a network management node node. This class                             |
| 20|       | of network variable is typically used for application configuration by                    |
| 21|       | a network manager.                                                                        |
| 22|       |                                                                                           |

| | | |
|---|---|---|
| 1 | type | Network variable typing serves two purposes: (1) typing ensures |
| 2 | | proper use of the variable in the compilation, and (2) typing ensures |
| 3 | | proper connection of network variables at bind time. Network |
| 4 | | variables may be declared as any one of the following types: |
| 5 | | [signed] long integer |
| 6 | | unsigned long integer |
| 7 | | signed character |
| 8 | | [unsigned] character |
| 9 | | [signed] [short] integer |
| 10 | | unsigned [short] integer |
| 11 | | enumerated lists |
| 12 | | structures and unions of the above types |
| 13 | | standard network variable types (see Table VII) |
| 14 | | |
| 15 | bind_info (fields) | The following optional fields may be included in the declaration of a |
| 16 | | network variable; the compiler builds the BIF file utilizing |
| 17 | | information declared in these fields and the information in the BIF |
| 18 | | file is used for binding the network variable inputs and outputs. The |
| 19 | | fields are each optional and may be specified in any order. |
| 20 | | *offline* — is used to signal to the bind process that a node should be |
| 21 | | taken offline before an update can be made to the network variable. |
| 22 | | This option is commonly used with the config class network |
| 23 | | variable. |

*bind | bind(var_name)* — specifies whether the network variable is bound to network variables on other nodes (the usual case) or to a network variable on the same node. The default is *bind* which indicates that the network variable can be bound to network variables on other nodes. The other form, *bind (var_name)* allows binding an output to an input on the same node. The *var_name* is the name of another network variable on the same node. It should be noted that this option has been omitted from the currently preferred embodiment of the present invention.

*unackd | unackd_rpt | ack [(config | nonconfig)]* — tells the protocol layer of the network management software of the present invention the type of service to use for the variable. An unacknowledged (*unackd*) network variable uses minimal network resources to propagate its values to other nodes. As a result, propagation failures are more likely to occur, and such failures are not detected by the node. This class is typically used for variables which are updated on a frequent, periodic basis, where the loss of an update is not critical, or in cases where the probability of a collision or transmission error is extremely low. The *unackd_rpt* class of service is used when a variable is sent to a large group of other nodes; with this class the message is sent multiple times to gain a greater probability of delivery. Acknowledged (*ackd*) service provides for receiver node acknowledged delivery with retries. The keyword *config*, indicates the service type can be changed at the time connections are specified for the network variable. The keyword *nonconfig* indicates the service type cannot be changed at configuration time.

*authenticated | nonauthenticated [(config | nonconfig )]* — specifies whether the network variable requires use of an authentication to verify the identity of the sender node. The *config | nonconfig* keywords specify whether the authentication designation is configurable. The default in the system of the preferred embodiment is *nonauth (config)*.

*priority | nonpriority [(config | nonconfig)]* — specifies whether the network variable receives priority or not. The keywords *config | nonconfig* specify whether priority is configurable. The default is *nonpriority (config)*.

*rate_est (const_expression)* — specifies the estimated average message rate, in tenths of messages per second, that an associated network variable is expected to transmit or receive. This value assists the network administrator in configuring the network.

*max_rate_est (const_expression)* — specifies the estimated maximum message rate, in tenths of messages per second, that the associated network variable is expected to transmit or receive. This value assists the network administrator in configuring the network.

TABLE IX

BIF FILE FORMAT

The Binder Interface File (BIF) format comprises a number of records—one record per network variable and one record per message tag plus some overhead records. The format is designed to be concise with few lines of physical lines per record. The format of the file generally allows for the following record types: (1) File Header comprising timestamp and other general information (one record); (2) Global information comprising general information of indicating general information about the node and the application program running on the node; and (3) Network variable and message tag records for each network variable and message tag comprising information about the network variable or message tag.

Importantly, network variables and message tags may require differing amounts and formats of information. Therefore, as one aspect of the present invention, a record structure has been developed to allow efficient storage of the differing required information and efficient retrieval of the records. In addition, in order to conserve storage, the present invention discloses an encoding scheme to encode numeric information present in the records.

In general, string fields contain an asterisk if they are not applicable. Integer fields contain a zero. The first record in the file is a header which comprises three lines of commentary and copyright notice text and a timestamp. Following this header is one blank line followed by global information used by the binder process.

Global Information

The first global value line is a Program ID comprising eight 2-digit hexadecimal values, separated by colons. The second global value line comprises several numeric fields separated by spaces. The fields are defined in order as follows:

- Either a 1 or a 2 which specifies the number of domains.
- The number of address table 901 slots in the range of decimal 1-15.
- Either a 0 or a 1. Indicates whether the node application program handles incoming messages.
- The number of network variables defined by the application program in the range of 0 to 62.
- The number of message tags defined by the application program in the range 0 to 15.
- The number of network input buffers (encoded, see below).
- The number of network output buffers (encoded, see below).
- The number of priority network output buffers (encoded, see below).
- The number of priority application output buffers (encoded, see below).
- The number of application output buffers (encoded, see below).
- The number of application input buffers (encoded, see below).
- The size of a network input buffer (encoded, see below).
- The size of a network output buffer (encoded, see below).
- The size of an application input buffer (encoded, see below).
- The size of an application output buffer (encoded, see below).

The third line is used for node-specific parameters and has not been fully defined in the currently preferred embodiment. The fourth and following lines are optional and may include a node documentation string which may be transmitted to the network management node for documenting, for example, the general function of the node. If not supplied, these nodes comprise a single asterisk. If supplied, these lines each begin with a double-quote character which is not included as part of the documentation string. Multiple lines are concatenated without any intervening characters. There is no end double quote. The global values section ends with a blank line.

As noted above, buffer sizes and count fields are encoded. The encoded values allow selected values, given below, to be stored in a nibble, thus reducing the size of the database. In the preferred embodiment, buffer sizes must be one of 20, 21, 22, 24, 26, 30, 34, 42, 50, 66, 82, 114, 146, 210 or 255 (i.e., 15 allowed buffer size values where the buffer sizes are given in bytes); non-priority buffer counts must be one of 1, 2, 3, 5, 7, 11, 15, 23, 31, 47, or 63 (i.e., 11 allowed buffer size values). Priority buffer counts must be one of 0, 1, 2, 3, 5, 7, 11, 15, 23, 31, 47, or 63 (i.e., 12 allowed buffer size values).

In order to represent these values in a single nibble (4 bits), the following formulas are used to transform the nibble value (n) to the above values:

for buffer sizes: $2^{n/2} + (n\&1) * 2^{n/2-1} + 18$ (except where n = 0; size = 255); and for count (priority and non-priority): $2^{n/2} + (n\&1) * 2^{n/2-1} - 1$ where n is the nibble value and the & symbol indicates a logical AND function between the four bit n value and 0001 (e.g., for n = $3_{10}$, the result of n&1 is 0011&0001=0001 or $1_{10}$, for n=2, the result is $0_{10}$; in general for any even number n, the value of this function will be 0 and for any odd number n, the value will be 1). Also, in the above equations, integer arithmetic is used; therefore, where fractional values result in the computation of a value (e.g., $n/2$ where n = 1), the fractional values are rounded down to the next lowest integer (e.g., for n=1, n/2 = 1/2, is rounded down to 0). Use of the above formula, as opposed to, for example a table lookup routine, leads to decreased requirements for static memory.

Network Variable and Message Tag Records

Zero or more records are produced which correspond to the network variables and message tag definitions in the program. Message tag records begin with the word "TAG"; Network variable messages begin with "VAR". Following the "TAG" or "VAR" identifier is a string of at maximum 16 characters which is the name of the tag or variable. Next, there is a decimal number (0-61 for network variables; 0-14 for message tags) which translates the name into an internal program index for the object code. Finally, there are two rate estimates, each a decimal number from 0-255, which are the rate_est and max_rate_est, respectively, in units of tenths of a message per second.

The second line of each record corresponds to the bind_info fields and other numeric fields in the order and as defined below:

| Field | Values |
|---|---|
| offline specifier | 0 or 1 |
| bindable specifier | 0 or 1 |
| bind target index | 0-61 (63 if no bind target is specified) |
| direction | 0=input, 1=output |
| service type | 0=acknowledged, 1=unackd_rpt, 2=unackd |
| service type configurable? | 1=yes, 0=no |
| authenticated? | 1=yes, 0=no |
| authenticated configurable? | 1=yes, 0=no |
| priority | 1=yes, 0=no |
| priority configurable? | 1=yes, 0=no |
| polled | 1=yes, 0=no |

| | |
|---|---|
| synchronized | 1=yes, 0=no |
| config | 1=yes, 0=no |

The third and any subsequent lines optionally contain variable documentation in the same format as the node documentation described above. If no documentation is supplied, a single asterisk is used.

For network variables, the remaining lines following any documentation comprise the following information. Message tags do not require this information.

The first line following the documentation lines is a header in which a first field indicates whether the variable is a standard network variable type; if so, the remaining fields are ignored and there are no more lines in the record. The format of the line, in order of the fields, is as follows:

| Field | Values |
|---|---|
| Standard network variable type number | 1-255 (0 if not a standard type) |
| First typedef name used in the definition | maximum length 16 characters, * if none |
| Number of elements in the type | 1 unless structured or union, 256 max |

There is one additional line per element, (where the number of elements was given immediately above). The format of these lines is as follows, in order of the fields presented:

| Field | Values |
|---|---|
| Basic Type | 0=char, 1=integer, 2=long, 3=bitfield, 4=union |
| Bitfield Offset | 0-7, 0 if not applicable |
| Bitfield / union size | 1-7 for bitfield; 1-31 for union; 0 if not applicable |
| Signedness | 0=unsigned, 1=signed |
| Array bound | 1-31, 0 if not an array |

TABLE X

BIF FILE FOR PROGRAM OF TABLE V

```
File: node_31_right.bif generated by APC Revision 0.99
Copyright (c) 1990 Echelon Corporation
Run on Mon Feb 4   10:31:40   1991

48:56:41:43:6F:6D:70:00
2 15 0 14 0 3 3 3 3 3 3 11 9 4 2
*
*

VAR MinOffTime 0 0 0
0 1 63 0 0 1 0 1 0 1 0 0 1
*
0 *   1
2 0 0 1 0
VAR MinOnTime 1 0 0
0 1 63 0 0 1 0 1 0 1 0 0 1
*
0 *   1
2 0 0 1 0
VAR OutletWater 2 0 0
0 1 63 0 0 1 0 1 0 1 0 0 1
*
0 *   2
1 0 0 1 0
1 0 0 1 0
VAR CndnsrHead 3 0 0
0 1 63 0 0 1 0 1 0 1 0 0 1
*
0 *   2
1 0 0 1 0
1 0 0 1 0
VAR CoolAir 4 0 0
0 1 63 0 0 1 0 1 0 1 0 0 1
*
0 *   2
1 0 0 1 0
1 0 0 1 0
VAR CmprssrInltGas 5 0 0
0 1 63 0 0 1 0 1 0 1 0 0 1
```

```
1   *
2   0 *   2
3   1 0 0 1 0
4   1 0 0 1 0
5   VAR OutletWaterTemp 6 0 0
6   0 1 63 0 0 1 0 1 0 1 0 0 0
7   *
8   0 *   1
9   1 0 0 1 0
10  VAR CndnsrHeadTemp 7 0 0
11  0 1 63 0 0 1 0 1 0 1 0 0 0
12  *
13  0 *   1
14  1 0 0 1 0
15  VAR CoolAirtemp 8 0 0
16  0 1 63 0 0 1 0 1 0 1 0 0 0
17  *
18  0 *   1
19  1 0 0 1 0
20  VAR CmprssrGasPrssr 9 0 0
21  0 1 63 0 0 1 0 1 0 1 0 0 0
22  *
23  0 *   1
24  1 0 0 1 0
25  VAR BuildingCooling 10 0 0
26  0 1 63 0 0 1 0 1 0 1 1 0 0
27  *
28  0 boolean      1
29  1 0 0 1 0
30  VAR MotorOn 11 0 0
31  0 1 63 1 0 1 0 1 0 1 0 0 0
32  *
33  0 boolean      1
34  1 0 0 1 0
35  VAR MotorOverload 12 0 0
36  0 1 63 1 0 1 0 1 0 1 0 0 0
37  *
38  0 boolean      1
39  1 0 0 1 0
40  VAR AmOnline 13 0 0
41  0 1 63 1 0 1 0 1 0 1 0 0 0
42  *
43  0 boolean      1
44  1 0 0 1 0
```

TABLE XI

I/O DEVICE DECLARATION

Each I/O device is declared in the application program as an external "device name". The syntax for such declaration is as follows:

<pin> <type> [<assign>] <device-name> [=<initial-output-level>];

where <pin> is one of the eleven reserved pin names: IO_0, IO_1, IO_2, IO_3, IO_4, IO_5, IO_6, IO_7, IO_8, IO_9, and IO_10;

<type> is one of the following types, may specify the indicated pins and is subject to the indicated restrictions:

(1) *output bit* — Used to control the logical output state of a single pin, where 0 equals low and 1 equals high; may specify any pin IO_0 to IO_10 and is unrestricted.

(2) *input bit* — Used to read the logical output state of a single pin, where 0 equals low and 1 equals high; may specify any pin IO_0 to IO_10 and is unrestricted.

(3) *[output] bitshift [numbits (<expr>)] [clockedge ({ + | - })] [kbaud (<expr>)]* — Used to shift a data word of up to 16 bits out of the node. Data is clocked out by an internally generated clock. *numbits* specifies the number of bits to be shifted; *clockedge* specifies whether the data is stable on the positive going or negative going edge; and *kbaud* specifies the baud rate. Requires adjacent pin pairs; the pin specification specifies the low numbered pin of the pair and may be IO_0 through IO_6 or IO_8 or IO_9.

(4) *[input] bitshift [numbits (<expr>)] [clockedge ({ + | - })] [kbaud (<expr>)]* — Used to shift a data word of up to 16 bits into the node. Data is clocked in by an internally

— 78 — generated clock. *numbits* specifies the number of bits to be shifted; *clockedge* specifies whether the data is read on the positive going or negative going edge; and *kbaud* specifies the baud rate. Requires adjacent pin pairs; the pin specification specifies the low numbered pin of the pair and may be IO_0 through IO_6 or IO_8 or IO_9.

(5) *[output] frequency [invert] [clock (<expr>)]* — This device type produces a repeating square wave output signal whose period is a function of an output value and the selected clock, *clock (<expr>)*, where *clock (<expr>)* specifies one of 8 clocks provided by the node. Must specify IO_0 or IO_1. The mux keyword (see below) must be specified for IO_0 and the ded keyword (see below) must be specified for IO_1.

(6) *[output] triac sync <pin> [invert] [clock (<expr>)]* — This device type is used to control the delay of an output pulse signal with respect to an input trigger signal, the *sync* input. Must specify IO_0 or IO_1. The mux keyword (see below) must be specified for IO_0 and the ded keyword (see below) must be specified for IO_1. If IO_0 is specified, the sync pin must be IO_4 through IO_7; if IO_1 is specified, the sync pin must be IO_4.

(7) *[output] pulsewidth [invert] [clock (<expr>)]* — This device type is used to produce a repeating waveform which duty cycle is a function of a specified output value and whose period is a function of a specified clock period. Must specify IO_0 or IO_1. The mux keyword (see below) must be specified for IO_0 and the ded keyword (see below) must be specified for IO_1.

(8) *input pulsecount [invert]* — This device type counts the number of input edges at the input pin over a period of 0.839 seconds. Must specify IO_4 through IO_7.

(9) *output pulsecount [invert] [clock (<expr>)]* — This device type produces a sequence of pulses whose period is a function of the specified clock period. Must specify IO_0 or IO_1. The mux keyword (see below) must be specified for IO_0 and the ded keyword (see below) must be specified for IO_1.

(10) *[input] ontime [invert] [clock (<expr>)]* — This device type measures the high period of an input signal in units of the specified clock period. Must specify IO_4 through IO_7.

(11) *{output / input } serial [baud (<expr>)]* — This device type is used to transfer data using an asynchronous serial data format, as in RS-232 communications. Output serial must specify IO_10; input serial must specify IO_8.

(12) *parallel* — This device type is used to transfer eight bit data words between two nodes across an eleven pin parallel bus. This is a bidirectional interface. Requires all pins and must specify IO_0.

(13) *neurowire select <pin> [kbaud (<expr>)]* — This device type is used to transfer data using a synchronous serial data format. Requires three adjacent pins and must specify IO_8. The select pin must be one of IO_0 through IO_7.

(14) *[input] quadrature* — This device type is used to read a shaft or positional encoder input on two adjacent pins. Requires adjacent pin pairs; the pin specification specifies the low numbered pin of the pair and may be IO_0 through IO_6 or IO_8 or IO_9.

(15) *[input] period [invert] [clock (<expr>)]* — This device type measures the total period from negative going edge to negative going edge of an input signal in units of the specified clock period. Must specify IO_4 through IO_7.

(16) *{output} oneshot [invert] [clock (<expr>)]* — This device type produces a single output pulse whose duration is a function of a specified output value and the selected clock value. Must specify IO_0 or IO_1. The mux keyword (see below) must be specified for IO_0 and the ded keyword (see below) must be specified for IO_1.

(17) *{output / input } nibble* — This device type is used to read or control four adjacent pins simultaneously. Requires four adjacent pins; the pin specifies denotes the lowest number pin of the quartet and may be pin IO_0 through IO_4.

(18) *{output / input } byte* — This device type is used to read or control eight pins simultaneously. Requires eight adjacent pins; the pin specification denotes the lowest number pin and must be IO_0.

(In general, pins may appear in a single device declaration only; however, a pin may appear in multiple declarations if the types belong to the set of {bit, nibble and byte});

where <assign> is one of "mux" which indicates the device is assigned to a multiplexed timer counter circuit or "ded" which indicates the device is assigned to a dedicated timer counter circuit; and where <initial-output-state> is a constant expression used to set the output pin of the channel to an initial state at initialization time (e.g., when the application program is reset).

TABLE XII

ACCESS TO I/O DEVICES VIA BUILT IN FUNCTIONS

To access one of the I/O devices (after declaring it as shown above), the application programmer merely calls one of the built-in functions defined below. These built-in functions appear syntactically to be nothing more than procedure calls. However, these procedure calls are not be defined as external functions to be linked in. Instead, these procedure names are "known" to the compiler, and the compiler enforces type checking on the parameters of the procedures.

The built-in function syntax is as follows:

```
<return-value> io_in   ( <device> [<args>] )
<return-value> io_out  ( <device>, <output-value> [<args>] )
``` where the <device> name corresponds to an I/O device declaration and <args> are as follows, depending on the type of device:

| | |
|---|---|
| bitshift | [, <numbits>] |
| serial (output only) | , <count> |
| serial (input only) | , <input-value>, <count> |
| neurowire (output only) | , <count> |
| neurowire (input only) | , <input-value>, <count> |
| parallel (output only) | , <count> |
| parallel (input only) | , <input-value>, <count> |

All other devices do not permit extra arguments in the calls to io_in or io_out.

Some of the above arguments may also appear in the device declaration. If the attribute is specified in the declaration and the attribute is supplied as an argument, the argument overrides the declared value for that call only. These attributes may be specified in both places, either place or not at all. If left unspecified, the default is used (see defaults below).

The data type of the <return-value> for the function io_in, and the data type of the <output-value> for io_out is given by the following table. The data values will be implicitly converted as necessary. A warning is output by the compiler if an io_in that returns a 16-bit quantity is assigned to a smaller value.

| | | |
|---|---|---|
| bit | short | bit 0 used; others are 0 |
| bitshift | long | shifted value |
| frequency | long | period in nanoseconds |
| pulsewidth | short | pulsewidth in nanoseconds |
| pulsecount | long | count in .84 seconds |
| ontime, period | long | period in nanoseconds |
| quadrature | short | signed count |
| oneshot | short | count |
| nibble | short | bit 0-3 used; others are 0 |
| byte | short | all bits used |

For period, pulsecount and ontime input devices, the built-in variable "input_is_new" is set to TRUE whenever the io_in call returns an updated value. The frequency with which updates occur depends on the device declaration For parallel, serial and neurowire, io_out and io_in require a pointer to the data buffer as the <output-value> and the <input-value>, respectively. For parallel and serial, io_in returns a short integer which contains the count of the actual number of bytes received.

Ranges and defaults

The following ranges and defaults apply to the various IO attributes:

- The bitshift "numbits" may be specified in the bitshift declaration as any number from 1 to 16 and, if not specified, defaults to 16. In the calls to io_in and io_out, the shift value may be any number from 1 to 127. For io_in, only the last 16 bits shifted in will be returned. For io_out, after 16 bits, zeroes are shifted out.
- The bitshift output clock may be either '+' or '-'. It defaults to '+'. This defines whether the data is shifted on the positive-going or negative-going edge of the clock. This can only be specified in the declaration.
- The initial frequencies of the frequency output, triac output, pulsewidth output and pulsecount output are 0.
- The clock value specifies a clock in the range 0...7 where 0 is the fastest clock and 7 is the slowest. The defaults are as follows:

frequency output    0 triac output    7 pulsewidth output    0

|  |  |
|---|---|
| pulsecount output | 7 |
| oneshot output | 7 |
| ontime input | 2 |
| period input | 0 |

The baud rate of serial may be 300, 1200 or 2400 baud with a default of 2400.

- The baud rate for neurowire and bitshift may be 1,10 or 25 kbits/second and defaults to 25 kbits/second.

Example

An example follows—to read a switch attached to pin 1 and light an LED attached to pin 2 when the switch is closed, the following would be coded by the application programmer:

```
IO_1 input bit ch1 switch;
IO_2 output bit led;
if (io_in(switch))
{
    io_out (led, TRUE);
}
```

I/O Multiplexing

The timer counter circuit may be multiplexed among pins 4 to 7. To facilitate this, the following built-in function is provided:

io_select (<device>);

This function causes the specified device to become the new owner of the timer counter circuit. Any reinitialization of the timer counter circuit is handled by this function. It is under the application's control when the timer counter is connected to which pin. The multiplexed timer counter is initially assigned to the mux device which is declared first.

For example, the application may choose to select a new device after a when change clause has executed for the current connected device. Alternatively, the selection could be done based on a timer, e.g., select a new device every 100 milliseconds.

TABLE XIII

WHEN STATEMENT SYNTAX

The syntax of a when statement in the system of the preferred embodiment is given below:

[priority] when (event) task where:

priority     is an option used to force evaluation of the following when clause each time the scheduler runs. This allows priority when clauses to be evaluated first. Within a program having multiple priority when clauses, priority when clauses are evaluated in the order coded in the program. If any priority when clause evaluates to true, the corresponding task is run and the scheduler starts over at the top of the priority when clauses. If no priority when clause evaluates to true then a non-priority when clause is evaluated and selected in a round robin fashion. The scheduler then starts over with the priority when clauses. This process may be best understood by example:

Assume the following when clauses coded in the following order:

priority when (A)

priority when (B)

when (C)

when (D).

Assume only C and D are true; first A is evaluated, then B is

| | | |
|---|---|---|
| 1 | | evaluated and finally C is evaluated and the task associated with C is |
| 2 | | executed. A is then evaluated again, then B is evaluated and then, in |
| 3 | | round robin fashion, D is evaluated and executed. |
| 4 | event | may be either a predefined event or, importantly, may be any valid C |
| 5 | | expression. Predefined events include, by way of example, input |
| 6 | | pin state changes (io changes, io update occurs); network variable |
| 7 | | changes (network variable update completes, network variable |
| 8 | | update fails, network variable update occurs, network variable |
| 9 | | update succeeds); timer expiration; message reception information |
| 10 | | (message arrives, message completes, message fails, message |
| 11 | | succeeds); and other status information (powerup, reset, online, |
| 12 | | offline). |
| 13 | task | is a C compound statement consisting of a series of C declarations |
| 14 | | and statements enclosed in braces. |
| 15 | | |
| 16 | The following predefined events exist in the system of the preferred embodiment: | |
| 17 | flush_completes | A flush function is available in the system of the preferred |
| 18 | | embodiment which causes the node to monitor the status of all |
| 19 | | incoming and outgoing messages. When the node has |
| 20 | | completed processing of all messages the flush_complete event |
| 21 | | becomes true indicating all outgoing transactions have been |
| 22 | | completed, no more incoming messages are outstanding, and no |
| 23 | | network variable updates are occurring. |

| | | |
|---|---|---|
| 1 | io_changes | This event indicates the status of one or more I/O pins associated |
| 2 | | with a specified input device have changed state. |
| 3 | io_update_occurs | This event indicates that a timer/counter device associated with a |
| 4 | | specified pin has been updated. |
| 5 | msg_arrives | This event indicates a message has arrived for processing. |
| 6 | msg_completes | This event indicates a message has completed (either |
| 7 | | successfully or by failure). |
| 8 | msg_fails | This event indicates a message has failed. |
| 9 | msg_succeeds | This event indicates a message has completed successfully. |
| 10 | nv_update_completes | This event indicates a network variable update has completed |
| 11 | | (either successfully or by failure). |
| 12 | nv_update_fails | This event indicates a network variable update has failed |
| 13 | nv_update_occurs | This event indicates a network variable update has occurred. |
| 14 | nv_update_succeeds | This event indicates a network variable update has completed |
| 15 | | successfully. |
| 16 | offline | This event indicates the node has been taken offline. |
| 17 | online | This event indicates the node has been brought online. |
| 18 | powerup | This event indicates the node has been powered up. |
| 19 | reset | This event indicates the node has been reset. |
| 20 | resp_arrives | This event indicates a response has arrived to a message. |
| 21 | timer_expires | This event indicates the designated timer has expired. |
| 22 | | |

1 | Predefined events may be used within other control expressions in addition to in the
2 | when statement; for example, in an if, while or for statement.
3 | As noted above, a user-defined event may be any valid C expression and may
4 | include assignment statements to assign values to global variables and function calls.
5 |

TABLE XIV

ASSEMBLY LANGUAGE LISTING FOR THE

NETWORK VARIABLE PROGRAM OF TABLE V

```
; APC - Echelon (R) Neuron (R) Application-C Compiler
; Copyright (c) 1990, Echelon Corporation
; Assembly code from APC Revision 0.99
; Code generated from 'node_ 31 _ right.nc' on Mon Feb 4 10:31:40 1991

SUBHEAD Generated from the input file: node_ 31_ right.nc

RADIX HEX

SEG    EECODE.
           ORG    0F000
NBMTS      EQU    000
NNVS       EQU    00E
PROTECT    EQU    00

NEURONID
     RES         8
DIRECTORY
           data.b PTR TEVT-3*NNVS,PROTECT+NNVS,0,0
PROGID
           data.b 048,056,041,043,06F,06D,070,000
MODETABLE
           data.b 053
           data.b 0F0,037
           data.b 024,09B
           data.b 033,033,033
EENEARBYTES
           data.b 000
           data.b 000,000
           data.b 001,000,000,047
LOCATION
     RES   8
COMM
     RES   10
MSG
     RES   1
DOMAIN
     RES   01E
```

```
1    ADDR
2         RES        04B
3    TNVCNFG
4         RES              3 *NNVS
5    CONFIGCHECKSUM
6         RES        1
7         PAGE
8    ; Boilerplate file for compiler-generated assembly output
9    ; Copyright (c) 1990, 1991 Echelon Corporation. All Rights Reserved.
10   ; Date last modified: 1/30/91
11   ; List of exported symbols
12         EXPORT APINIT,DOMAIN,EENEARBYTES,MODETABLE,TEVT
13   ; List of imported symbols - Library functions
14         IMPORT     application _ restart,delay,error log
15         IMPORT     flush,flush _ cancel,flush _ wait,go _ offline,go _ unconfigured
16         IMPORT     node _ reset,offline _ confirm, _ post events,powerup
17         IMPORT     random,retrieve _ status,retrieve _ xcvr _ status
18         IMPORT     reverse,timers _ off,watchdog _ update
19   ; List of imported symbols - Compiler helper functions
20         IMPORT     _abs8, _ abs16, _ add16, _and16, _ alloc
21         IMPORT     _bcd2bin, _bin2bcd,_ dealloc
22         IMPORT     _div8, _div8s, _div16, _div16s
23         IMPORT     _drop_n, _drop_n _preserve_1, _drop_n_preserve_ 2
24         IMPORT     _drop _n_ return_ 1, _drop_ n_ return_ 2
25         IMPORT     _eeprom_write, _eeprom _wrlte _long
26         IMPORT     _eeprom_far_write,_ eeprom_ far_ write_ long
27         IMPORT     _equal 8, _equal 116
28         IMPORT     _gequ8,_ gequ8s,_ gequ16,_ gequ16s
29         IMPORT     _less8,_ less8s,_ less16,_ less16s
30         IMPORT     _log8,_ log16,_ lognot8,_ lognot16
31         IMPORT     _l_shift8, _ l shift8s,_ l_ shift16, _ l_ shift16s
32         IMPORT     _l_shift8 3, 1 shift8_4, 1_shift8_5, 1_shift8_6, 1 shift8_7
33         IMPORT     _max8,_ max 8s,_ max16,_ max16s
34         IMPORT     _memcpy,_ memcpyl,_ memset,_ memsetl
35         IMPORT     _min8,_ min8s,_ min16, _ min16s
36         IMPORT     _minus_16_s
37         IMPORT     _mod8,_ mod8s,_ mod16,_ mod16s,_ mul8,_ mul16
38         IMPORT     _not16,_ or16
39         IMPORT     _pop, _push
40         IMPORT     _r_ shift8,_ r_ shift8s,_ r_ shift16,_ r_ shift16s
41         IMPORT     _r_ shift8_ 3, _r _shift8_ 4,_ r_ shift8_5,_ r_ shift8_ 6,_ r_ shift8_ 7
42         IMPORT     _register_ call,_ sign_ extend16
43         IMPORT     _sub16, _xor16
44         PAGE
45   ; List of imported symbols - I/O functions
46         IMPORT     _bit_ input,_ bit_ input_ d,_ bit_ output
```

```
1       IMPORT     _bitshift_ input,_ bitshift_ output
2       IMPORT     _byte_ input,_ byte_ output
3       IMPORT     _nibble_ input,_ nibble_ input_ d,_ nibble_ output
4       IMPORT     _frequency_ output,_ leveldetect_ input
5       IMPORT     _neurowire_ input,_ neurowire_ output
6       IMPORT     _oneshot_ output,_ ontime_ input
7       IMPORT     _parallel_ input,_ parallel_ input_ ready
8       IMPORT     _parallel_ output,_ parallel_ output_ ready,_ parallel_ output_ request
9       IMPORT     _period_ input
10      IMPORT     _pulsecount_ input,_ pulsecount_ output
11      IMPORT     _pulsewidth_ output
12      IMPORT     _quadrature_ input
13      IMPORT     _serial_ input,_ serial_ output
14      IMPORT     _totalize_ input,_ triac_ output,_ triggered_ count_ output
15      IMPORT     _init_ timer_ counter1,_ init_ timer_ counter2
16      IMPORT     _init_ baud,_ io_ set_ clock
17      IMPORT     _io_ input_ value,_ io_ change_ init,_ select_ input_ fn
18  list of imported symbols - Messaging support
19      IMPORT     _bound_ mt
20      IMPORT     _msg_ alloc,_ msg_ alloc_ priority,_ msg_ cancel,_ msg_ free
21      IMPORT     _msg_ receive,_ msg_ send
22      IMPORT     _msg_ addr_ blockget,_ msg_ addr_ get,_ msg_ auth_ get,_ msg_ code_ get
23      IMPORT     _msg_ data_ blockget,_ msg_ data_ get,_ msg_ len_ get,_ msg_ service_ get
24      IMPORT     _msg_ addr_ blockset,_ msg_ addr_ set,_ msg_ auth_ set,_ msg_ code_ set
25      IMPORT     _msg_ data_ blockset,_ msg_ data_ set,_ msg_domain_ set,_ msg_ node_ set
26      IMPORT     _msg_ priority_ set_,_ msg_ service_ set,_ msg_ tag_ set
27      IMPORT     _resp_ alloc,_ resp_ cancel,_ resp_ free,_ resp_ receive,_ resp_ send
28      IMPORT     _resp_ code_ set,_ resp_ data_ blockset,_ resp_ data_ set
29
30  ; List of imported symbols - Network Variable support
31      IMPORT     _bound_ nv,_ nv_ poll,_ nv_ poll_ all
32      IMPORT     _nv_ update,_ nv_ update_ int,_ nv_ update_ long
33      IMPORT     _nv_ update_ int_ offset,_ nv_ update_ long_ offset
34  ; List of imported symbols - Timer support
35      IMPORT     _timer_ get, timer_ off
36      IMPORT     _timer_ mset,_ timer_ mset_ repeat,_ timer_ sset,_ timer_ sset_ repeat
37  ; List of imported symbols - Event support
38      IMPORT     _flush_ completes
39      IMPORT     _io_ changes,_ io_ changes_ to,_ io_ changes_ by,_ io_ update_ occurs
40      IMPORT     _msg_ arrives,_ msg_ code_ arrives
41      IMPORT     _msg_ completes,_ msg_ fails,_ msg_ succeeds
42      IMPORT     _nv_ update_ completes,_ nv_ update_ fails,_ nv_ update_ succeeds
43      IMPORT     _nv_ update_ occurs
44      IMPORT     _offline, _online,_ resp_ arrives
45      IMPORT     _timer_ expires,_ timer_ expires_ any,_ wink
46  ; List of Imported symbols - Misc builtin function support
```

```
1           IMPORT      _sleep
2    ; End boilerplate file
3
4    PAGE
5
6           SEG         ENEAR
7           ORG         CONSTRAINED
8    %MinOffTime
9           RES         02
10          EXPORT      %MinOffTime
11
12          SEG         EENEAR
13          ORG         CONSTRAINED
14   %MinOnTime
15          RES         02
16          EXPORT      %MinOnTime
17
18          SEG         EENEAR
19          ORG         CONSTRAINED
20   %OutletWater
21          RES         02
22          EXPORT      %OutletWater
23
24          SEG         EENEAR
25          ORG         CONSTRAINED
26   %CndnsrHead
27          RES         02
28          EXPORT      %CndnsrHead
29
30          SEG         EENEAR
31          ORG         CONSTRAINED
32   %CoolAir
33          RES         02
34          EXPORT      %CoolAir
35
36          SEG         EENEAR
37          ORG         CONSTRAINED
38   %CmprssrInltGas
39          RES         02
40          EXPORT      %CmprssrInltGas
41
42          SEG         RAMNEAR
43          ORG         CONSTRAINED
44   %OutletWaterTemp
45          RES         01
46          EXPORT      %OutletWaterTemp
```

```
            SEG        RAMNEAR
            ORG        CONSTRAINED

%CndnsrHeadTemp
            RES        01
            EXPORT     %CndnsrHeadTemp SEG        RAMNEAR
            ORG        CONSTRAINED
%CoolAirTemp
            RES        01
            EXPORT     %CoolAirTemp SEG        RAMNEAR
            ORG        CONSTRAINED
%CmprssrGasPrssr
            RES        01
            EXPORT     %CmprssrGasPrssr

SEG        RAMNEAR
            ORG        CONSTRAINED

RES        01
            EXPORT     %BuildingCooling

SEG        RAMNEAR
            ORG        CONSTRAINED
%MotorOn
            RES        01
            EXPORT     %MotorOn SEG        RAMNEAR
            ORG        CONSTRAINED
%MotorOverload
            RES        01
            EXPORT     %MotorOverload SEG        RAMNEAR
            ORG        CONSTRAINED
%AmOnline
            RES        01
            EXPORT     %AmOnline

SEC        RAMNEAR
            ORG
```

```
1   % strikes
2         RES         01
3         EXPORT      %strikes
4
5         SEG         CODE
6         ORG
7         EXPORT      %motor
8
9
10  %motor ; Function body
11        push        tos
12        push        #0B
13        call        _nv_update_int
14        push        tos
15        pushs       #00
16        call        _bit_output
17        pushs       01
18        push        next
19        call        _equal8
20        sbrnz       *+4
21        brf         %motor+01D
22        push        %MinOnTime
23        push        %MinOnTime+01
24        pushs       #01
25        call        _timer_sset
26        brf         %motor+026
27        push        %MinOffTime
28        push        %MinOffTime+01
29        pushs       #00
30        call        _timer_sset
31        dealloc     #01
32
33        SEG         CODE
34        ORG
35        EXPORT      %control_action
36  %control_action ; Function body
37        push        [1] [@NEAR (%CoolAirTemp)]
38        push        %CoolAir+1
39        call        _less8s
40        push        %CmprssrInltGas
41        push        [l][@NEAR(CmprssrGasPssr)]
42        call        _less8s
43        push        %CndnsrHead
44        push        [1] [ @ NEAR ( %CndnsrHeadTemp)]
45        push        [1] [@NEAR (%OutletWaterTemp)]
46        push        %OutletWater+01
```

| | | |
|---|---|---|
| 1 | call | _less8s |
| 2 | pushs | #00 |
| 3 | pushs | #00 |
| 4 | pushs | #00 |
| 5 | call | _timer_get |
| 6 | call | _equal16 |
| 7 | push | [1] [@NEAR(%BuildingCooling)] |
| 8 | push | [1] [@NEAR( %AmOnline) ] |
| 9 | and | |
| 10 | and | |
| 11 | and | |
| 12 | and | |
| 13 | and | |
| 14 | and | |
| 15 | sbrnz | *+4 |
| 16 | brf | %control_action+038 |
| 17 | pushs | #01 |
| 18 | callf | %motor |
| 19 | brf | %control_action+06A |
| 20 | push | %CoolAir |
| 21 | push | [1] [ @NEAR (%CoolAirTemp) ] |
| 22 | call | _less8s |
| 23 | push | [1] [@NEAR (%CmprssrGasPrssr) ] |
| 24 | push | %CmprssrInltGas+01 |
| 25 | call | _less8 |
| 26 | push | [1][@NEAR(%CndnsrHeadTemp)] |
| 27 | push | %CndnsrHead+01 |
| 28 | call | _less8s |
| 29 | push | %OutletWater |
| 30 | push | [1][[@NEAR(%OutletWaterTemp)] |
| 31 | call | _less8s |
| 32 | pushs | #00 |
| 33 | pushs | #00 |
| 34 | pushs | #01 |
| 35 | call | _timer_get |
| 36 | call | _equal16 |
| 37 | push | [1][@NEAR(%BuildingCooling)] |
| 38 | and | |
| 39 | and | |
| 40 | and | |
| 41 | and | |
| 42 | and | |
| 43 | sbrnz | *+4 |
| 44 | brf | %control_action+06A |
| 45 | pushs | #00 |
| 46 | callf | %motor |

```
1       ret
2
3          SEG       CODE
4          ORG
5  WHEN1
6          EXPORT    WHEN1
7          callf     %control_action
8          ret
9
10         SEG       CODE
11         ORG
12 WHEN2
13         EXPORT    WHEN2
14         push      #0A
15         call      _sign_extend16
16         pushs     #02
17         call      _timer_sset
18         push      #040
19         call      _pulsecount_input
20         push      #0B4
21         call      _sign_extend16
22         call      _less16
23         sbrnz     *+4
24         brf       WHEN2+02E
25         pushs     #03
26         push      [1][@NEAR(%strikes)]
27         inc
28         push      tog
29         pop       [1][@NEAR(%strikes)]
30         call      _gequ8s
31         sbrnz     *+4
32         brf       WHEN2+02B
33         pushs     #00
34         callf     %motor
35         pushs     #01
36         push      #0C
37         call      _nv_update_int
38         brf       WHEN2+031
39         pushs     #00
40         pop       [1][@NEAR(%strikes)]
41         ret
42
43         SEG       CODE
44         ORG
45 APINIT : Init & event code
46         push      #084
```

```
 1        push        #072
 2        call        _init_timer_counter1
 3        ret
 4        EXPORT      RESET
 5   RESET ; When-unit body
 6        pushs       #00
 7        push        #0B
 8        call        _nv_update_int
 9        pushs       #00
10        push        #0C
11        call        _nv_update_int
12        pushs       #01
13        push        #0D
14        call        _nv_update_int
15        pushs       #00
16        callf       %motor
17        push        %OutletWater
18        pop         [1[@NEAR(%OutletWaterTemp)]
19        push        %CndnsrHead
20        pop         [1] [@NEAR(%CndnsrHeadTemP) ]
21        push        %CoolAir
22        pop         [1] [@NEAR(%CoolAirTemp) ]
23        push        %CmprssrInltGas
24        pop         [1] [@NEAR ( %CmprssrGasPrssr) ]
25        pushs       #00
26        pop         [1][@NEAR(%strikes)]
27        push        #0A
28        call        _nv_poll
29        ret
30        EXPORT      OFFLINE
31   OFFLINE; When-unit body
32        pushs       #00
33        push        #0D
34        call        _nv_update_int
35        pushs       #00
36        callf       %motor
37        ret
38        EXPORT      ONLINE
39
40   ONLINE ; When-unit body
41        pushs       #01
42        push        #0D
43        call        _nv_update_int
44        pushs       #00
45        callf       %motor
46        pushs       #00
```

```
            push            #0C
            call            _nv_update_int
            ret SEG             CODE
            ORG
TNVFIX ; NV Fixed table
            data.b          022,PTR %MinOffTime
            data.b          022,PTR %MinOnTime
            data.b          022,PTR %OutletWater
            data.b          022,PTR %CndnsrHead
            data.b          022,PTR %CoolAir
            data.b          022,PTR %CmprssrInltGas
            data.b          021,PTR %OutletWaterTemp
            data.b          021,PTR %CndnrHeadTemp
            data.b          021,PTR %CoolAirTemp
            data.b          021,PTR %CmprssrGasPrssr
            data.b          021,PTR %BuildingCooling
            data.b          021,PTR %MotorOn
            data.b          021,PTR %MotorOverload
            data.b          021,PTR %AmOnline TEVT ; Event table
            data.b          PTR APINIT-2
            data.b          0,RESET-APINIT+1
            data.b          OFFLINE-APINIT+1,ONLINE-APINIT+1
            data.b          00,02
            data.b          OFF,PTR WHEN1-1
            data.b          0A,PTR WHEN2-1

; Resource usage information
            RESOURCE        NADDR       0F
            RESOURCE        NDOM        2
            RESOURCE        NRCVTX      08
            RESOURCE        NTMR        03
            RESOURCE        NNIB        02
            RESOURCE        NNOB        02
            RESOURCE        NAIB        02
            RESOURCE        NAOB        02
            RESOURCE        NNPOB       02
            RESOURCE        NAPOB       02
            RESOURCE        SNIB        042
            RESOURCE        SNOB        02A
            RESOURCE        SAIB        016
            RESOURCE        SAOB        014
            RESOURCE        NNVS        0E
```

TABLE XV

GENERAL DEFINITIONS

The following definitions are generally applicable to terms used in this specification:

Neuron, or node: A neuron or node is an intelligent, programmable element or elements providing remote control, sensing, and/or communications, that when interconnected with other like elements forms a communications, control and/or sensing network. Nodes are named with Neuron ids (see below). Nodes may be addressed as a part of a domain and subnet using a node number. The node number in the preferred embodiment is 7 bits. Multiple nodes may be addressed using a group id. The group id in the preferred embodiment is 8 bits.

Neuron id: Nodes in the present invention are assigned a unique identification number at the time of manufacture. The identification number is preferably 48-bits long. This 48-bit identification number does not change during the lifetime of node. As is appreciated, the assignment of a unique identification to each individual node allows for numerous advantages. This 48-bit identification number may be referred to as the node_id.

Domain addresses: The term "domain" is used to describe a virtual network wherein all communication, as supported by the network of the present invention, must be within a single domain. Any required inter-domain communication must be facilitated by application level gateways. In the preferred embodiment, domains are identified with 48-bit domain identifiers. However, in certain applications the size of the domain field may vary.

1    Subnet — In the preferred embodiment, a subnet is a subset of a domain
2    containing from 0 to 127 nodes. In the preferred embodiment, subnets are identified with
3    an 8-bit subnet identification number. A single domain may contain up to 255 subnets.
4    Group: A group is a set of nodes which work together to perform a common
5    function. In the preferred embodiment, groups are identified with an 8-bit group
6    identification number. A single domain may contain up to 255 groups. For example, a
7    group may be created to include all nodes in a connection, such as connection_2 142 in
8    which case the group would include a node at temperature sensor_2 116, a node at cell_1
9    101 and a node at cell_2 121.
10   Addressing — The present invention provides for a hierarchical address structure
11   and supports three basic addressing modes: (1) (Domain, Subnet, Node number); (2)
12   (Domain, Subnet, Node_id); and (3) (Domain, Group).
13

What is claimed is:

1. A method for communicating information between nodes in a network, the method comprising the steps of:

a reader node sending a first message over said network to a writer node, said first message including a first set of control information;

the writer node performing the following steps in response to receiving said first message:

determining a variable in a first application associated with said writer node that uniquely corresponds to said first set of control information;

retrieving a value from a storage location that corresponds to said variable of said first application;

sending a response message containing said value and a second set of control information to said reader node;

the reader node performing the steps of:

receiving said response message; and determining a variable in a second application associated with said reader node that uniquely corresponds to said second set of control information;

storing said value in a location that corresponds to said variable in said second application.

2. The method of claim 1 wherein:

the step of sending said first message includes sending said first message to a plurality of writer nodes; and said plurality of writer nodes respond to said first message by sending a plurality of response messages to said writer node, wherein each writer node sends a response message that includes a value and a set of control information.

3. The method of claim 2 wherein said reader node performs the following steps for each of said plurality of response messages:

determining a variable in said second application that uniquely corresponds to the control information contained in said response message; and storing the value from said response message in a location that corresponds with said variable.

4. The method of claim 2 wherein, within each writer node of said plurality of writer nodes, the first set of control information uniquely identifies one of a plurality of variables in an application associated with said writer node.

5. The method of claim 1 wherein the step of sending a first message over said network comprises transmitting said first message to a plurality of writer nodes over a multicast connection.

6. The method of claim 1 further comprising the step of said second application changing the value in said location to a new value without said reader node transmitting said new value over said network.

7. The method of claim 1 further comprising the step of storing in the variable of the first application a value that reflects readings of a sensor associated with said writer node.

8. A network comprising a plurality of interconnected nodes including:

a reader node and a set of writer nodes;

said reader node being configured to send a first message to said set of writer nodes;

each of said writer nodes being configured to respond to said first message by determining a variable that is uniquely identified by information contained in said first message, said variable being a variable used by an application that resides on said writer node;

locating a value associated with said variable, and sending a response message to said first message, said response message containing said value;

said reader node being configured to receive the response messages that were sent by said set of writer nodes in response to said first message;

said reader node being configured to respond to each response message by determining a variable that is uniquely identified by information contained in said response message, said variable being a variable used by an application that resides on said reader node, and storing the value in said response message in a location that corresponds to the variable that is uniquely identified by the information contained in said response message.

9. The network of claim 8 wherein each of said plurality of response messages contains information that uniquely identifies a different variable used by the application that resides in said reader node than the other of said plurality of response messages.

10. A method for communicating information between nodes in a network, the method comprising the steps of:

a writer node storing plurality of bits in a first message;

sending the first message to a plurality of reader nodes;

each of the plurality of reader nodes performing the step of:

receiving the first message;

reading control information from said first message;

determining a variable that uniquely corresponds to said control information, said variable being a variable in an application that is associated with said reader node; and storing one or more bits from said first message into a storage location associated with the variable.

* * * * *